(12) United States Patent
McElroy et al.

(10) Patent No.: US 9,190,685 B2
(45) Date of Patent: Nov. 17, 2015

(54) SOFC SYSTEM WITH SELECTIVE CO2 REMOVAL

(75) Inventors: James McElroy, Suffield, CT (US); Matthias Gottmann, Sunnyvale, CA (US); Chockkalingam Karuppaiah, Cupertino, CA (US); Arne Ballantine, Palo Alto, CA (US); Swaminathan Venkataraman, Cupertino, CA (US); John Finn, Mountain View, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 885 days.

(21) Appl. No.: 13/282,899

(22) Filed: Oct. 27, 2011

(65) Prior Publication Data
US 2013/0108936 A1    May 2, 2013

(51) Int. Cl.
*H01M 8/06* (2006.01)
*H01M 8/04* (2006.01)
*H01M 8/12* (2006.01)

(52) U.S. Cl.
CPC ........ *H01M 8/0668* (2013.01); *H01M 8/04097* (2013.01); *H01M 8/04156* (2013.01); *H01M 2008/1293* (2013.01); *Y02E 60/50* (2013.01); *Y02E 60/525* (2013.01)

(58) Field of Classification Search
CPC ............ H01M 8/0668; H01M 8/0497; H01M 8/04156; H01M 2008/1293; Y20E 60/50
USPC ....................................................... 429/410
See application file for complete search history.

(56) References Cited

U.S. PATENT DOCUMENTS

| | | | |
|---|---|---|---|
| 6,924,053 B2 | 8/2005 | McElroy | |
| 7,591,880 B2* | 9/2009 | Levan et al. | 95/97 |
| 7,833,668 B2 | 11/2010 | Ballantine et al. | |
| 7,883,803 B2 | 2/2011 | McElroy et al. | |
| 2002/0110503 A1* | 8/2002 | Gittleman et al. | 422/190 |
| 2006/0172160 A1* | 8/2006 | Min et al. | 429/13 |
| 2007/0178338 A1 | 8/2007 | McElroy et al. | |
| 2008/0241612 A1 | 10/2008 | Ballantine et al. | |
| 2008/0241638 A1 | 10/2008 | McElroy et al. | |
| 2010/0239924 A1 | 9/2010 | McElroy et al. | |

* cited by examiner

*Primary Examiner* — Miriam Stagg
*Assistant Examiner* — Brent Thomas
(74) *Attorney, Agent, or Firm* — The Marbury Law Group PLLC

(57) ABSTRACT

A system and method in which a high temperature fuel cell stack exhaust stream is recycled back into the fuel inlet stream of the high temperature fuel cell stack. The recycled stream may be sent to a carbon dioxide separation device which separates carbon dioxide from the fuel exhaust stream. The carbon dioxide separation device may be a carbon dioxide trap, an electrochemical carbon dioxide separator, or a membrane separator. A water separator may be used in conjunction with the carbon dioxide separation device or used separately to continuously remove water from the recycled stream.

9 Claims, 16 Drawing Sheets

SOFC SYSTEM WITH SELECTIVE CO2 REMOVAL

BACKGROUND

The present invention relates generally to the field of fuel cell systems and more particularly to fuel cell systems integrated with carbon dioxide removal components.

Fuel cells are electrochemical devices which can convert energy stored in fuels to electrical energy efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY OF THE INVENTION

The embodiments of the invention provide a system and method in which a high temperature fuel cell stack exhaust stream is recycled back into the fuel inlet stream of the high temperature fuel cell stack. The recycled stream may be sent to a carbon dioxide separation device which separates carbon dioxide from the fuel exhaust stream. The carbon dioxide separation device may be a carbon dioxide trap, an electrochemical carbon dioxide separator, or a membrane separator. The removal of carbon dioxide from the recycled anode exhaust increases the efficiency of the high temperature fuel cell stack. In one aspect of the invention, a water separator is used in conjunction with the carbon dioxide separation device to continuously remove water from the recycled stream. The removal of water from the recycled anode exhaust stream increases cell performance.

DETAILED DESCRIPTION OF THE EMBODIMENTS

Figure 1A:
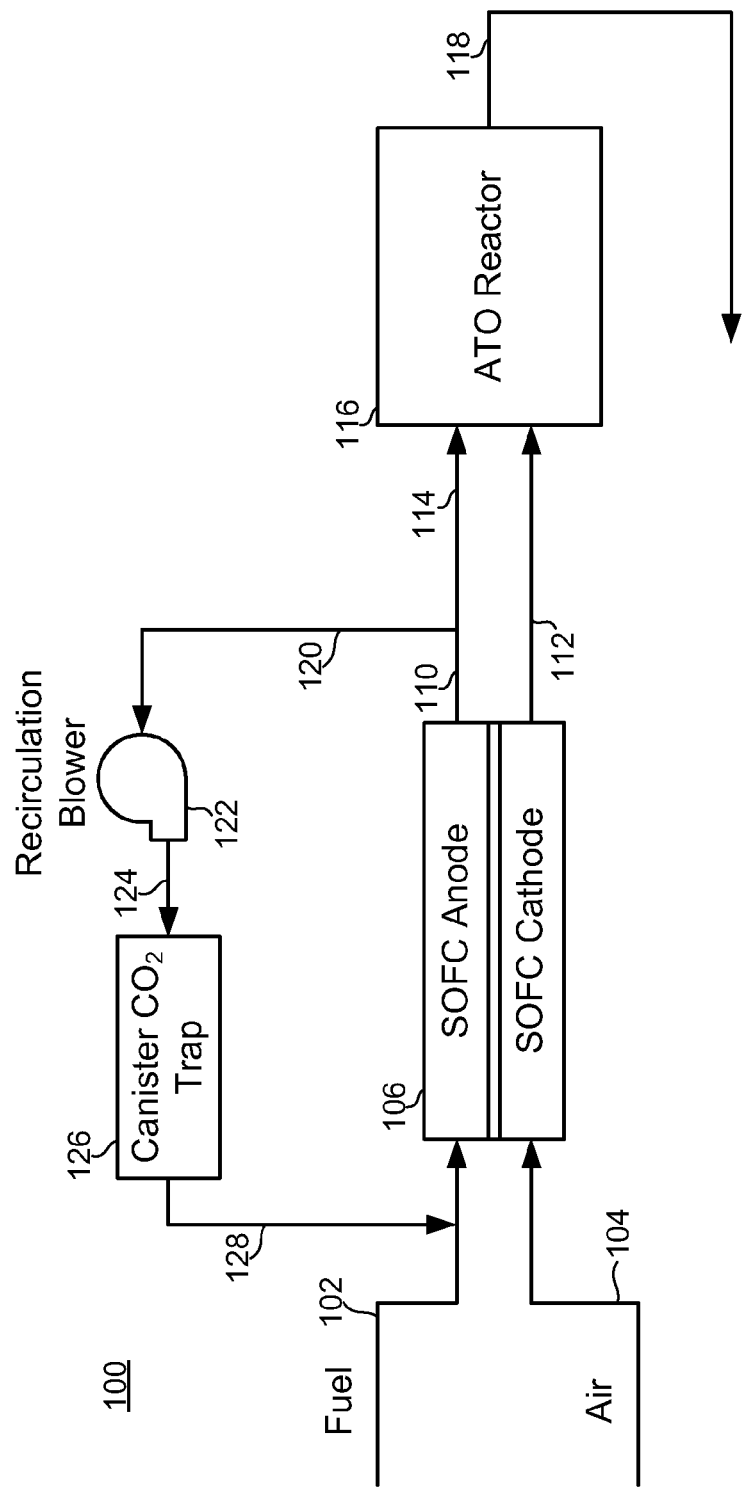
FIG. 1A is a schematic of a fuel cell system according to an embodiment of the present invention.

The embodiments of the invention illustrate how carbon dioxide separation devices may be used together with a fuel cell system, such as a solid oxide fuel cell system. Additional embodiments illustrate how water separation devices may be used together with a fuel cell system, such as a solid oxide fuel cell system. Additional embodiments illustrate how carbon dioxide separation devices and water separation devices may be used together with a fuel cell system, such as a solid oxide fuel cell system. It should be noted that other fuel cell systems, such as molten carbonate systems, may also be used.

FIG. 1 illustrates a fuel cell system 100 according to one embodiment of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite. Each fuel cell contains an electrolyte, an anode electrode on one side of the electrolyte anode chamber, a cathode electrode on the other side of the electrolyte in a cathode chamber, as well as other components, such as separator plates/electrical contacts, fuel cell housing and insulation. In an SOFC operating in the fuel cell mode, the oxidizer, such as air or oxygen gas, enters the cathode chamber, while the fuel, such as hydrogen or hydro-carbon fuel, enters the anode chamber. Any suitable fuel cell designs and component materials may be used. The system 100 further contains an anode tail gas oxidizer (ATO) reactor 116, a recirculation blower 122, and a canister carbon dioxide trap 126.

The system 100 operates as follows. The fuel inlet stream is provided into the fuel cell stack 106 through fuel inlet conduit 102. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel inlet conduit 102 provides the fuel inlet stream to the anode side of the fuel cell stack 106.

Air or another oxygen containing gas is provided into the stack 106 through an air inlet conduit 104. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120. The portion of fuel exhaust provided to the ATO reactor 116 and recycled via recycling conduit 120 may vary. For example 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by blower 122 power or blowing speed. The fuel exhaust stream provided into conduits 114 and 120 may contain the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

A recirculation blower 122 is coupled to recycling conduit 120 to provide the recycled fuel exhaust stream from recycling conduit 120 to a carbon dioxide canister trap 126 via recycling conduit 124. The recirculation blower 122 may be computer or operator controlled and may vary the amount and/or rate of the recycled fuel exhaust stream being provided to the carbon dioxide canister trap 126 and also the amount and/or rate of the carbon dioxide free or carbon dioxide depleted recycled fuel exhaust stream being provided back to the stack 106. As such, the recirculation blower 122 may be used to increase or decrease the overall recycling rate in system 100.

The carbon dioxide canister trap 126 may be any type carbon dioxide trap, such as a consumable carbon dioxide trap. The carbon dioxide canister trap 126 has no carbon dioxide conduit. Instead, the carbon dioxide canister trap 126 is physically removed from the SOFC system by an operator when it fills up with carbon dioxide and is replaced with a clean trap. The carbon dioxide canister trap 126 may be placed downstream of the recirculation blower 122 and may be used to extend hotbox life so long as the carbon dioxide canister trap 126 may be routinely replaced. The carbon dioxide canister trap 126 removes carbon dioxide from the recycled fuel exhaust stream. Preferably, the carbon dioxide canister trap 126 removes substantially all the carbon dioxide from the recycled fuel exhaust stream. The carbon dioxide canister trap 126 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream. The carbon dioxide canister trap 126 may require daily change out of its carbon dioxide gathering components, or other suitable change out periodicity may be required. Bypass valve and conduit (not shown) may be provided to allow carbon dioxide canister trap 126 replacement of without power generation interruption. Preferably the carbon dioxide canister trap 126 is located outside of the hot box containing the fuel stack 106 for easy access for service personnel. Carbon dioxide canister trap 126 may be located in system housing containing the hot box.

Figure 1B:
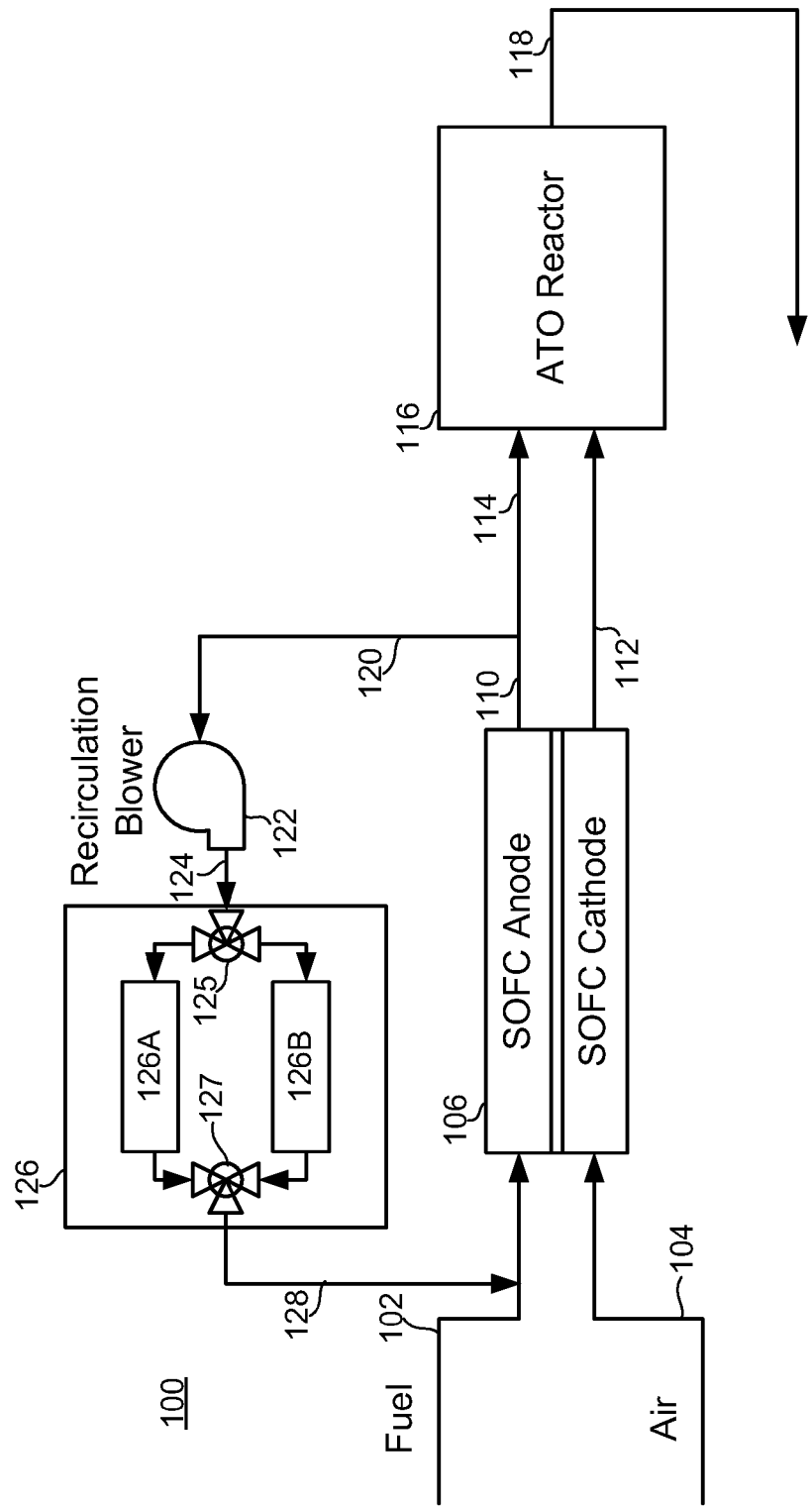
FIG. 1B is a schematic of a carbon dioxide separator of FIG. 1A.

FIG. 1B illustrates a schematic of a carbon dioxide canister trap 126 of FIG. 1A. The carbon dioxide canister trap 126 is shown in greater detail in FIG. 1B. The carbon dioxide canister trap 126 may be comprised of two carbon dioxide canister traps 126A and 126B. A valve 125 may be provided to allow the diversion of the recycled fuel exhaust stream from recycling conduit 124 to one or both of carbon dioxide canister traps 126A or 126B. Additionally the valve 125 may prevent the recycled fuel exhaust stream from flowing to one or both of carbon dioxide canister traps 126A and 126B. Carbon dioxide canister traps 126A and 126B remove carbon dioxide from the recycled fuel exhaust stream. A valve 127 may be provided to allow the isolation of carbon dioxide canister traps 126A and 126B from recycling conduit 128. The operation of valve 125 and valve 127 may allow a system operator to pass recycled fuel exhaust to one, both, or neither of the carbon dioxide canister traps 126A and 126B at the same time. Valve 125 and valve 127 may be configured to isolate either carbon dioxide canister trap 126A and 126B from system 100. In other words, carbon dioxide canister trap 126B may be isolated and replace while carbon dioxide trap 126A continues to function, and vice versa. This isolation may facilitate trap change out or other maintenance or regulate the rate of carbon dioxide removal without power generation interruption.

As illustrated in both FIGS. 1A and 1B the purified recycled fuel exhaust stream, with a reduced amount of carbon dioxide, is provided back to the fuel inlet stream for the fuel stack 106 via recycling conduit 128. The recycling of carbon dioxide depleted fuel exhaust into the fuel inlet increases the performance of the fuel cell stack 106.

Figure 2:
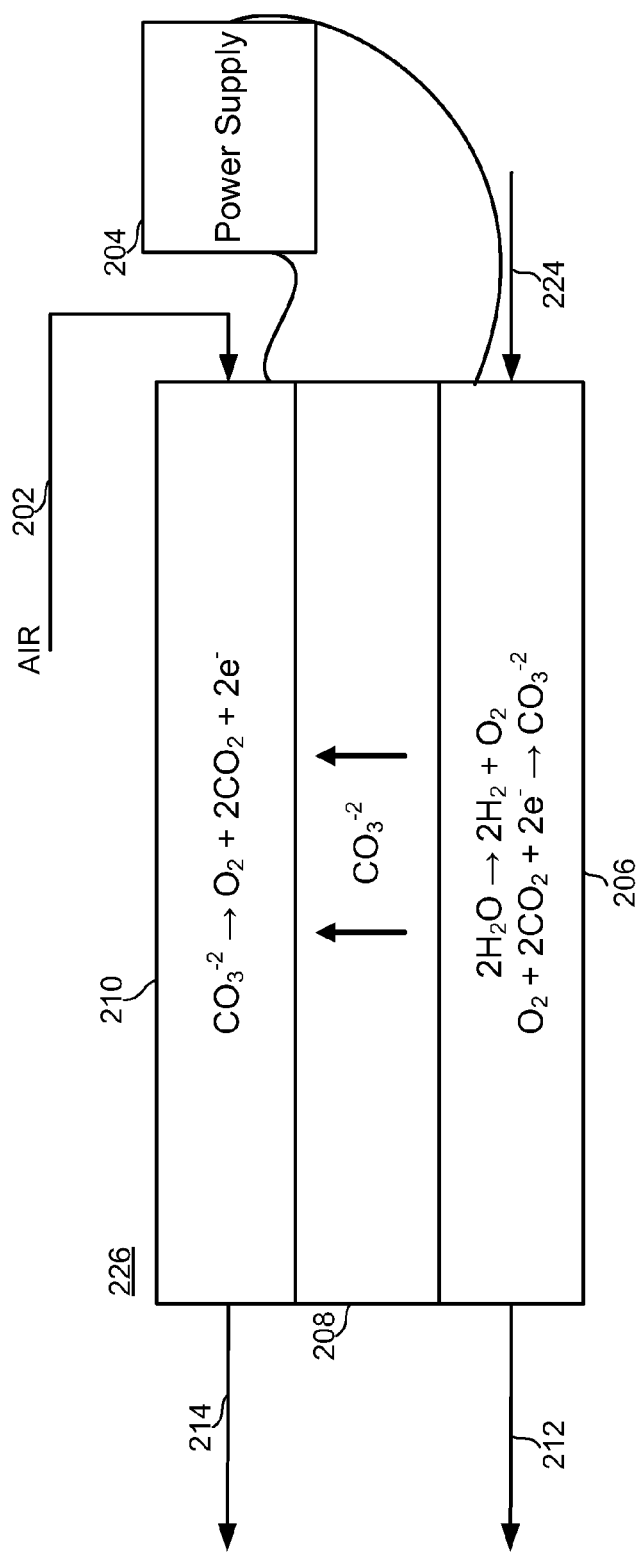
FIG. 2 is a schematic of a carbon dioxide separator capable of use with the embodiments of the present invention.

FIG. 2 illustrates an electrochemical carbon dioxide separator 226 according to another embodiment of the present invention. The electrochemical carbon dioxide separator 226 is one type of carbon dioxide separator which may be used with embodiments of the present invention. The electrochemical carbon dioxide separator 226 may be a molten carbonate fuel cell operated in electrolysis mode (i.e., with applied potential).

The electrochemical carbon dioxide separator 226 may receive a recycled fuel exhaust stream input via recycling conduit 224. The recycled fuel exhaust stream may consist of hydrogen, carbon dioxide, water, and carbon dioxide. The recycling conduit 224 may be coupled to the anode 206 chamber of the electrochemical carbon dioxide separator 226. Air is provided to the electrochemical carbon dioxide separator 226 via air input conduit 202 and used to purge the electrochemical carbon dioxide separator 226. Electricity is applied to the electrochemical carbon dioxide separator 226 from a power supply 204 to operate electrochemical carbon dioxide separator in electrolyzer mode. In an embodiment, the power supply 204 may comprise the fuel cell stack 106. The current applied transfers carbonate ions ($CO_3^{-2}$) from the anode 206, through the electrolyte 208, to the cathode 210 according to the following reaction:

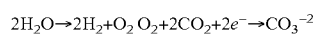

$$2H_2O \rightarrow 2H_2 + O_2\ O_2 + 2CO_2 + 2e^- \rightarrow CO_3^{-2} \qquad \text{Anode:}$$

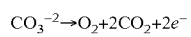

$$CO_3^{-2} \rightarrow O_2 + 2CO_2 + 2e^- \qquad \text{Cathode:}$$

The cathode 210 chamber is coupled to a carbon dioxide conduit 214 and carbon dioxide extracted from the recycled fuel exhaust stream exits the electrochemical carbon dioxide separator 226 via the carbon dioxide conduit 214.

The anode 206 chamber is further coupled to a purified recycled fuel exhaust stream conduit 212. Purified recycled fuel exhaust stream exiting the carbon dioxide separator anode 206 chamber via the purified anode exhaust conduit 212 contains less carbon dioxide than the recycled fuel exhaust stream that entered the carbon dioxide separator 226 via the recycling conduit 224. As a percentage of overall composition, the purified recycled fuel exhaust stream in the purified recycled fuel exhaust stream conduit 212 contains a greater percentage of hydrogen than the recycled fuel exhaust stream entering the carbon dioxide separator 206 via recycling conduit 224. Preferably, the electrochemical carbon dioxide separator 226 removes substantially all the carbon dioxide from the recycled fuel exhaust stream. The electrochemical carbon dioxide separator 226 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

Figure 3:
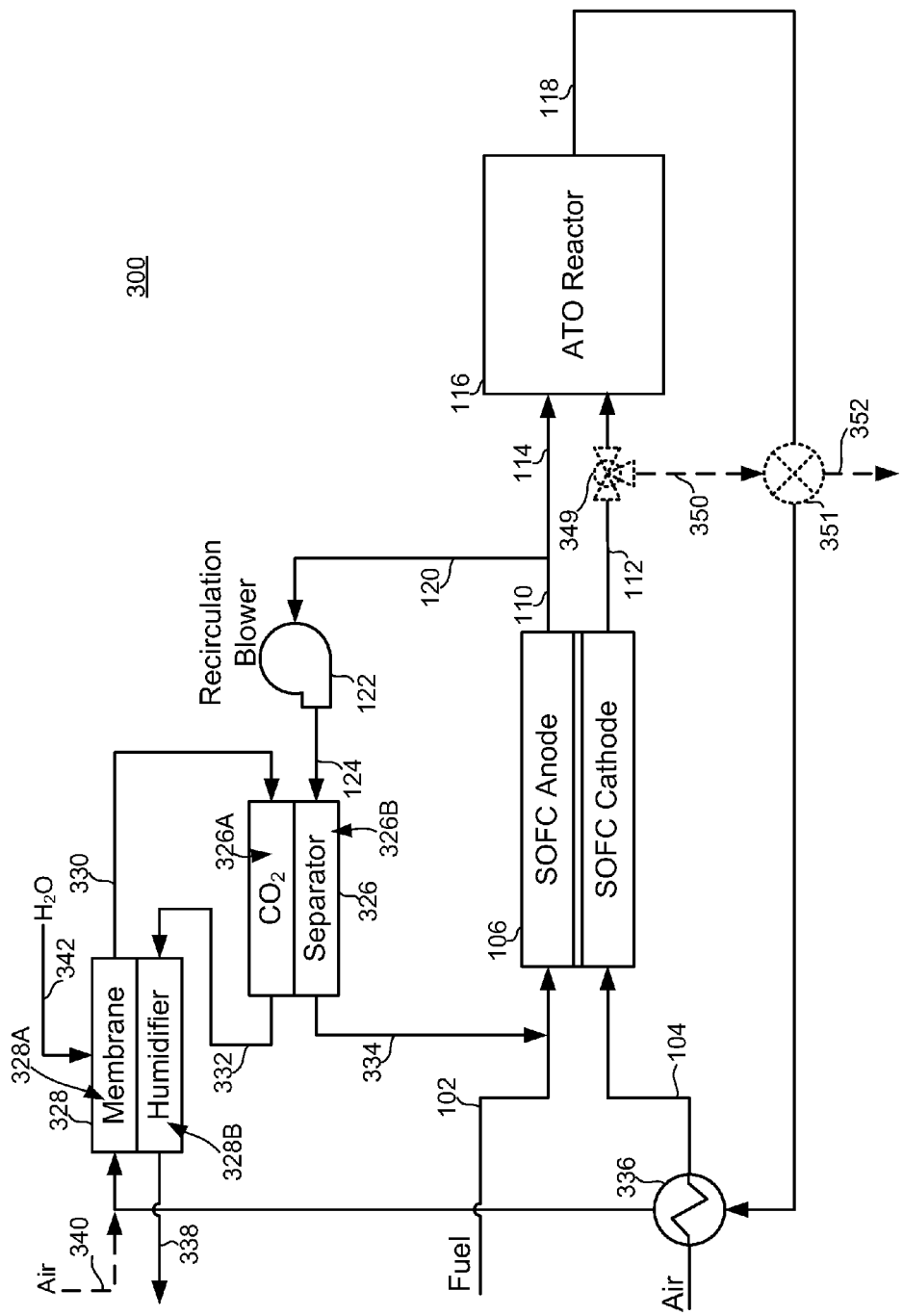
FIGS. 3-15 are schematics of fuel cell systems according to embodiments of the present invention.

FIG. 3 illustrates a system 300 according to an embodiment of the invention. The system 300 is similar to system 100 illustrated in FIG. 1 and contains a number of components in common. Those components which are common to both systems 100 and 300 are numbered with the same numbers in FIGS. 1 and 3 and will not be described further.

One difference between systems 100 and 300 is that system 300 may utilize a carbon dioxide separator 326 as opposed to a carbon dioxide canister trap 126. The carbon dioxide separator 326 may be any type carbon dioxide separator, such as a carbon dioxide membrane separator or an electrochemical carbon dioxide separator as discussed in relation to FIG. 2 above. Another difference between systems 100 and 300 is that system 300 may utilize ATO exhaust or SOFC cathode exhaust to sweep the collection side of the carbon dioxide separator 326 to remove carbon dioxide. An additional difference between systems 100 and 300 is that system 300 may bias the carbon dioxide separator 326 collection side gas with water.

Recycling conduit 124 may be coupled to the carbon dioxide separator 326. The recycled fuel exhaust stream is input to the carbon dioxide separator 326 via the recycling conduit 124, and carbon dioxide is removed from the recycled fuel exhaust stream to produce a purified (e.g., carbon dioxide depleted) recycled fuel exhaust stream. The purified recycled fuel exhaust stream exiting the carbon dioxide separator 326 contains less carbon dioxide than the recycled fuel exhaust stream that entered the carbon dioxide separator 326 via the recycling conduit 124. As a percentage of overall composition the purified recycled fuel exhaust stream contains a greater percentage of hydrogen than the recycled fuel exhaust stream entering the carbon dioxide separator 326 via recycling conduit 124. Preferably, the carbon dioxide separator 326 removes substantially all the carbon dioxide from the recycled fuel exhaust stream. The carbon dioxide separator 326 may remove less than 50%, or more than 50%, such as 50% to 60%, 60% to 70%, 70% to 80%, 80% to 90%, or 90% to 100%, such at about 98%, about 99%, or about 99.5% of the carbon dioxide from the recycled fuel exhaust stream.

The carbon dioxide separator 326 is coupled to recycling conduit 334. The purified recycled fuel exhaust stream, with a reduced amount of carbon dioxide, is provided back to the fuel inlet stream by the recycling conduit 334. The recycling of reduced carbon dioxide fuel exhaust into the fuel inlet increases the performance of the fuel cell stack 106.

The efficiency of the carbon dioxide separator 326 at selecting for carbon dioxide is increased by the biasing of the collection side of the carbon dioxide separator 326 by adding water to the collection side of the carbon separator 326.

In one embodiment, the hot exhaust from the ATO reactor 116 is passed via hot exhaust conduit 118 to a cathode recuperator heat exchanger 336 where the ATO exhaust exchanges heat with the air inlet stream provided through air inlet conduit 104. The heat exchanger helps to raise the temperature of the air in air inlet conduit 104 and reduces the temperature of the ATO exhaust in conduit 118 such that it does not damage the membrane humidifier 328.

In an alternative embodiment, all or a portion of the SOFC cathode exhaust may be passed directly to the cathode recuperator heat exchanger 336. A valve 349 may direct cathode exhaust from conduit 112 to conduit 350. Valve 349 may alternatively be a splitter (not shown) configured to direct a portion of the cathode exhaust to conduit 350 and a portion of the cathode exhaust to the ATO reactor. Valve 351 may be configured to direct the cathode exhaust received from conduit 350 toward the cathode recuperator heat exchanger 336 and prevent cathode exhaust from flowing to the ATO reactor 116. Additionally, valve 351 may be coupled to a conduit 352 to direct ATO exhaust and/or SOFC cathode exhaust out of the system 300 as exhaust. The utilization of valves 349 and 351 and conduit 350 may allow either SOFC cathode exhaust or ATO exhaust, a mixture of both ATO exhaust and SOFC cathode exhaust, or neither ATO exhaust nor SOFC cathode exhaust to pass to the cathode recuperator heat exchanger 336.

From the heat exchanger 336, the ATO exhaust conduit 118 may be coupled to a membrane humidifier 328. Air is input to the membrane humidifier 328 via conduit 118. Optionally, air may also be input to the membrane humidifier as via air conduit 340 coupled to the membrane humidifier 328. Air conduit 340 may input air supplied by a blower, fan, or compressor (not shown).

In operation, the membrane humidifier 328 humidifies an air or oxidized fuel stream for input into the carbon dioxide separator 326. The membrane humidifier 328 may comprise a polymeric membrane humidifier.

Water may be input to the membrane humidifier 328 via a water conduit 342 as necessary. Water is also may be collected by the membrane humidifier 328 from the carbon dioxide conduit 332, which is coupled between the carbon dioxide separator 326 and the membrane humidifier 332. The water permeates across the membrane from product side 328B to collection side 328A of membrane humidifier 328. The water from the conduit 342 is mixed in the membrane humidifier 328 with the ATO exhaust from conduit 118 and the now humid air passes to humid air conduit 330.

Humid air conduit 330 is coupled to the carbon dioxide separator 326 and the humid air or ATO exhaust is used to bias the separation of carbon dioxide by the carbon dioxide separator 326. Where a traditional carbon dioxide separator naturally selects for water in a reaction, the presence of water on the collection side of the carbon dioxide separator reduces the selection of water and increases the efficiency of the carbon dioxide separator to select for carbon dioxide. In this manner the increased amount of water in the air entering the collection side of the carbon dioxide separator 326 biases the carbon dioxide separator 326 to select for carbon dioxide from the recycled fuel exhaust stream. Preferably, the humid air or ATO exhaust contains a substantially equal amount of water as the recycled fuel exhaust stream. The humid air or ATO exhaust may contain about 90%, 80%, 70%, 60%, 50%, 40%, 30%, 20%, or 10% of the water contained in the recycled fuel exhaust stream. The term "about" provides a variation based on given processes variables, such as a variation of 10% or less, preferably 5% or less. The humid air or ATO exhaust may also contain more than 100% of the water contained in the recycled fuel exhaust stream, such as about 110%, 120%, 130%, 140%, 150%, 160%, 170%, 180%, 190%, or 200%.

Thus conduit 330 inputs a humid mix into the collection side 326A and conduit 332 outputs a carbon dioxide and humid mix from the collection side 326A of carbon dioxide separator 326. Conduit 124 inputs the recycled fuel exhaust into the product side 326B and conduit 334 outputs carbon dioxide depleted exhaust from the product side 326B of carbon dioxide separator 326.

Thus, conduits 340 and/or 118 provide an oxidizer to the collection side 328A and conduit 330 outputs a humidified oxidizer from the collections side 328A of membrane humidifier 328. Conduit 332 inputs carbon dioxide and humid mix into product side 328B and conduit 338 outputs carbon dioxide and from the product side 328B.

The humid air or ATO exhaust and carbon dioxide mixture travels from the collection side of the carbon dioxide separator via carbon dioxide conduit 332 to the membrane humidifier 328. The membrane humidifier 328 removes a portion of the water from the humid air mixture, and outputs carbon dioxide and air via output conduit 338. As discussed above, the water removed from the carbon dioxide conduit 332 by the membrane humidifier 328 may be used to humidify air or ATO exhaust entering the membrane humidifier 328. Thus, system 300 uses ATO exhaust or SOFC cathode exhaust to sweep the carbon dioxide separator collection side and/or to bias the collection gas with water.

Figure 4:
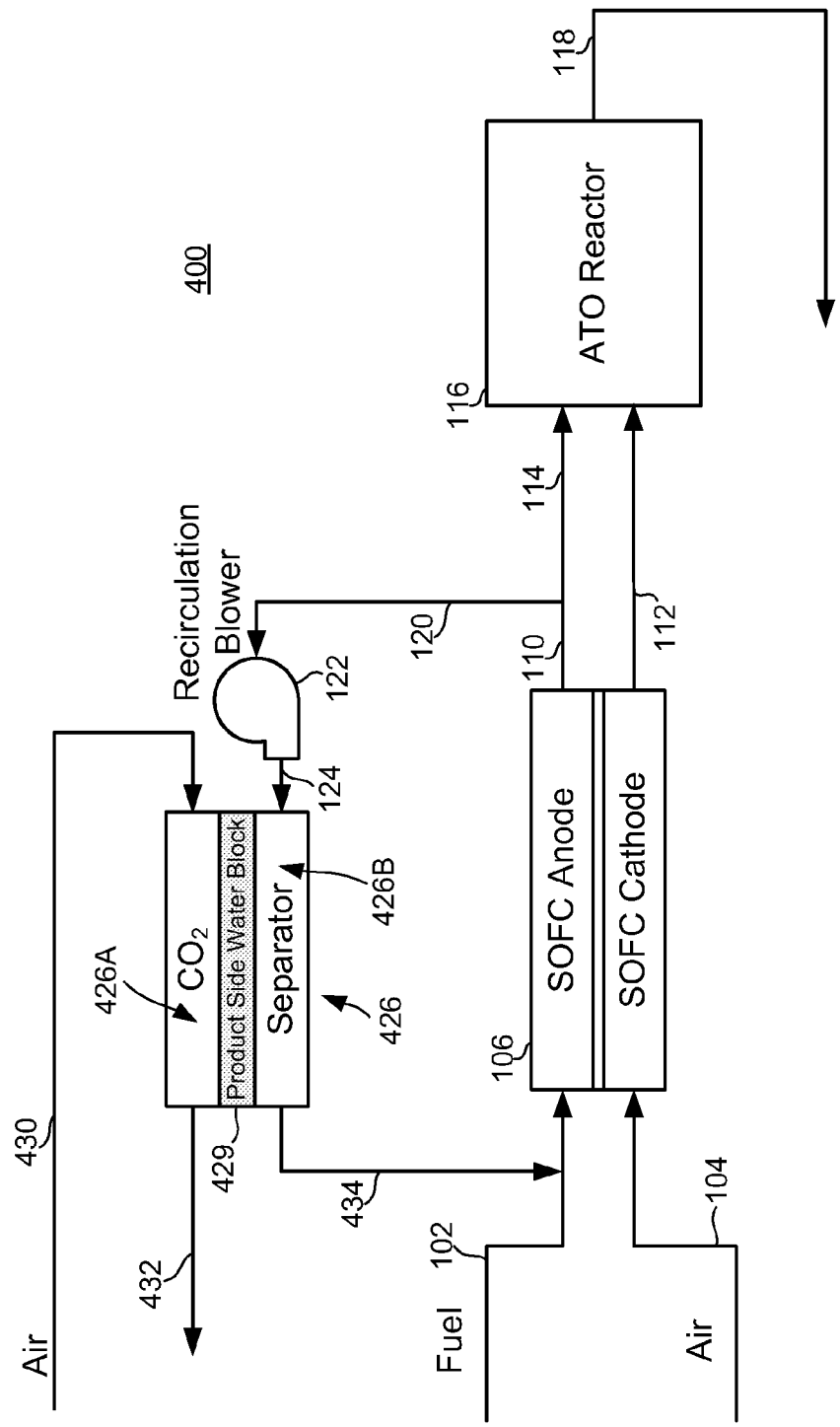

FIG. 4 illustrates a system 400 according to an embodiment of the invention. The system 400 is similar to system 100 illustrated in FIG. 1 and contains a number of components in common. Those components which are common to both systems 100 and 400 are numbered with the same numbers in FIGS. 1 and 4 and will not be described further.

One difference between systems 100 and 400 is that system 400 may utilize a carbon dioxide membrane separator 426 as opposed to a carbon dioxide canister trap 126.

A carbon dioxide membrane separator 426 may be a carbon dioxide membrane separator constructed with tailored membrane structure 429 to block water transport from the product side 426B (input side) to the collection side 426A of the carbon dioxide membrane separator. The tailored membrane structure, (the product side water block) 429 may be constructed of a material which allows carbon dioxide to pass, but will not allow water to pass. One such material which has been found to be effective for product side water block construction is polytetrafluoroethylene (Teflon®). The product side water block impedes water transport via accumulation or blockage into the purging air of the carbon dioxide membrane separator. The carbon dioxide membrane separator 426 may be constructed in a manner similar to an electrochemical carbon dioxide separator, but does not require the input of electrical current to operate.

Recycling conduit 124 may be coupled to the carbon dioxide membrane separator 426. The recycled fuel exhaust stream enters the product side 426B of the carbon dioxide membrane separator 426 via recycling conduit 124. The carbon dioxide membrane separator removes carbon dioxide from the recycled fuel exhaust stream. As previously discussed, the product side water block 429 of the carbon dioxide membrane separator impedes the transport of water, so only carbon dioxide is collected by the carbon dioxide membrane separator 426 on the collection side 426A. Preferably, the carbon dioxide membrane separator 426 removes substantially all the carbon dioxide from the recycled fuel exhaust stream. The carbon dioxide membrane separator 426 may remove less than 50% or greater than 50%, such as 50% to 60%, 60% to 70%, 70% to 80%, 80% to 90%, or 90% to 100%, such as about 98%, about 99%, or about 99.5% of the carbon dioxide from the recycled fuel exhaust stream.

The purified recycled fuel exhaust stream exiting the collection side 426A of the carbon dioxide membrane separator 426 contains less carbon dioxide than the recycled fuel exhaust stream that entered the product side 426B of the carbon dioxide separator 426 via the recycling conduit 124. As a percentage of overall composition the purified recycled fuel exhaust stream contains a greater percentage of hydrogen than the recycled fuel exhaust stream entering the carbon dioxide separator 426 via recycling conduit 124.

The product side 426B of the carbon dioxide membrane separator 426 is coupled to recycling conduit 434. The purified recycled fuel exhaust stream, with a reduced amount of carbon dioxide, is provided back to the fuel inlet stream by the recycling conduit 434. The recycling of reduced carbon dioxide fuel exhaust into the fuel inlet increases the performance of the fuel cell stack 106.

Purge air is provided to the collection side 426A of the carbon dioxide membrane separator 426 via air conduit 430 which is operatively coupled to the collection side 426A of the carbon dioxide membrane separator 426. Purge air removes carbon dioxide from the collection side 426A of the carbon dioxide membrane separator 426. The carbon dioxide membrane separator 426 is operatively coupled to output conduit 432 and the air and carbon dioxide mixture flows from the collection side 426A of the carbon dioxide membrane separator 426 to the output conduit 432.

Figure 5:
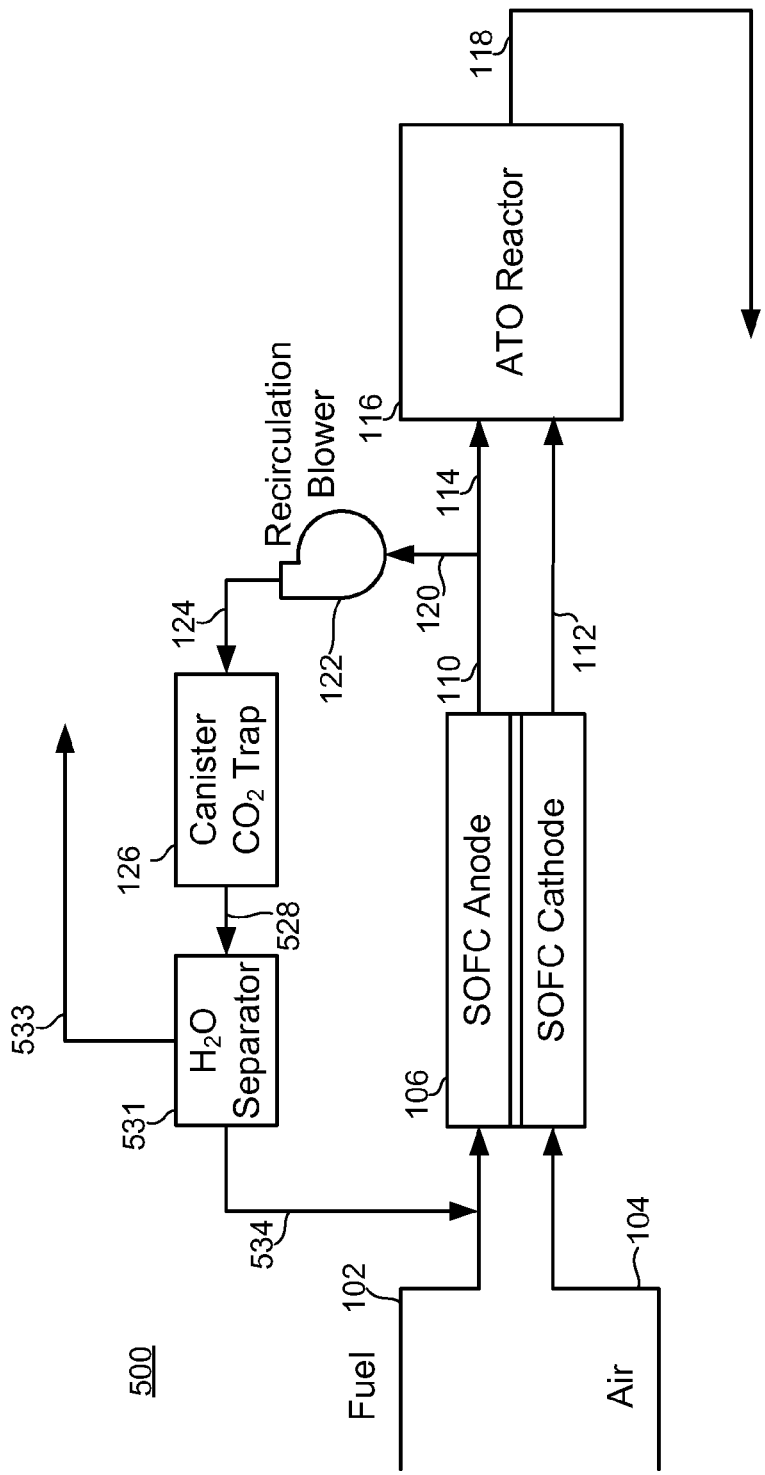

FIG. 5 illustrates a system 500 according to an embodiment of the invention. The system 500 is similar to system 100 illustrated in FIG. 1 and contains a number of components in common. Those components which are common to both systems 100 and 500 are numbered with the same numbers in FIGS. 1 and 5 and will not be described further.

One difference between systems 500 and 100 is that system 500 utilizes a water separator 531 in series with the carbon dioxide canister trap 126. The utilization of the water separator 531 allows water to be removed from the portion of the recycled fuel exhaust stream recycled to the fuel cell stack 106. The removal of water from the recycled fuel exhaust stream optimizes the steam to carbon ratio and increases cell performance.

A purified recycled fuel exhaust stream, containing less carbon dioxide, exits the carbon dioxide canister trap 126 via recycling conduit 528 and passes to a water separator 531. The water separator 531 may be any type water separator, such as a water condenser separator where steam is cooled to liquid water, which settles to the bottom of the separator while remaining gases (e.g., carbon monoxide, hydrogen, etc) exit via recycling conduit 534. The water separator 531 continuously removes water from the purified recycled fuel exhaust stream entering via recycling conduit 528. A drain in the water separator 531 may provide the collected water to water conduit 533. Preferably the water separator 531 removes substantially 50% of the water from the purified recycled fuel exhaust stream. The water separator 530 may remove less than 50%, such as about 50%-40%, 40%-30%, 30%-20%, 20%-10%, 10%-1%, 5%, 0.99%, 0.01%, or 0.001% of the water from the purified recycled fuel exhaust stream.

The purified recycled fuel exhaust stream exiting the water separator 531 contains less water than the purified recycled fuel exhaust stream that entered the water separator 531 via recycling conduit 528. Compared to the fuel exhaust stream originally exiting the fuel cell stack 106 via fuel exhaust conduit 110, the purified recycled fuel exhaust stream exiting the water separator 531 via recycling conduit 534 contains less water and less carbon dioxide overall. The removal of carbon dioxide and water results in the purified recycled fuel exhaust stream in recycling conduit 534 having an increased proportion of both hydrogen and carbon monoxide as a percentage of volume when compared to the fuel exhaust stream originally exiting the fuel cell stack 106 via the fuel exhaust conduit 110.

The recycled fuel exhaust stream exits the water separator 531 via recycling conduit 534 and the purified recycled fuel exhaust stream is provided back to the fuel inlet stream by the recycling conduit 534. The recycling of reduced carbon dioxide fuel exhaust into the fuel inlet increases the performance of the fuel cell stack 106 and the reduction of water increases cell performance.

Figure 6:
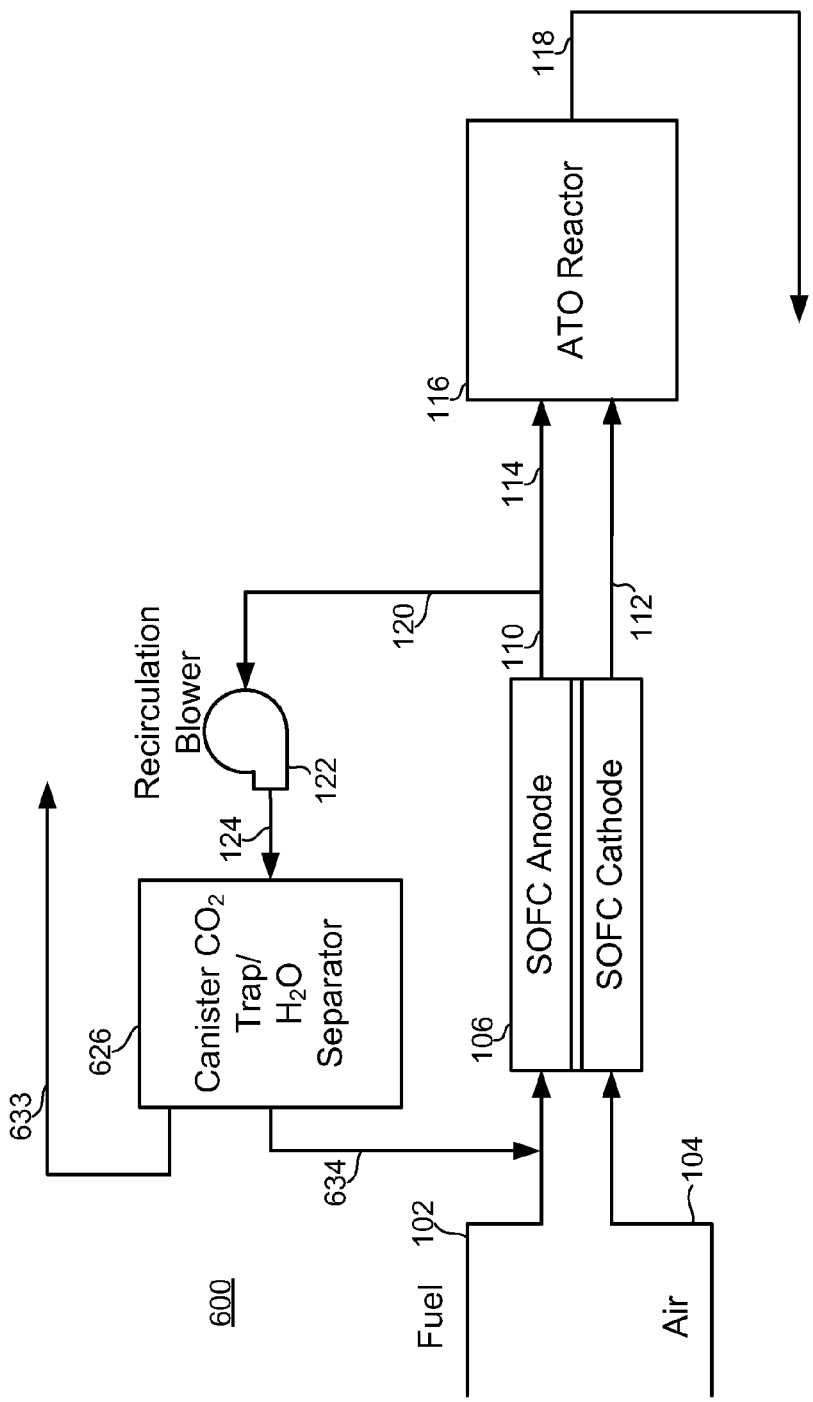

FIG. 6 illustrates a system 600 according to an embodiment of the invention. The system 600 is similar to system 500 illustrated in FIG. 5 and contains a number of components in common. Those components which are common to both systems 500 and 600 are numbered with the same numbers in FIGS. 5 and 6 and will not be described further.

One difference between systems 600 and 500 is that system 600 utilizes a combination carbon dioxide canister trap and water separator device 626 rather than only a carbon dioxide canister trap 126 and independent water separator 531. The combination carbon dioxide canister trap and water separator device 626 may be an integrated carbon dioxide trap and water separator. The combination carbon dioxide canister trap and water separator device 626 functions in a similar manner to produce a purified recycled fuel exhaust stream containing less carbon dioxide and less water to recycle to the fuel cell stack 106, the difference being the carbon dioxide and water are removed at the same time. The combination carbon dioxide canister trap and water separator device 626 continuously removes carbon dioxide and water from the recycled fuel exhaust stream. A drain on the combination carbon dioxide canister trap and water separator device 626 may provide the collected water to water conduit 633. The carbon dioxide canister trap and water separator device 626 may remove carbon dioxide and water in the same volumes and ratios as discussed above in relation to system 500.

The combination carbon dioxide canister trap and water separator device 626 receives the recycled fuel exhaust stream via recycling conduit 124. The combination carbon dioxide canister trap and water separator device 626 removes carbon dioxide and water from the recycled fuel exhaust stream to produce a purified recycled fuel exhaust stream. The purified recycled fuel exhaust stream is passed from the combination carbon dioxide canister trap and water separator device 626 to recycling conduit 634.

The purified recycled fuel exhaust stream exiting the combination carbon dioxide canister trap and water separator device 626 contains less water than the recycled fuel exhaust stream that entered combination carbon dioxide canister trap and water separator device 626 via recycling conduit 124. Compared to the fuel exhaust stream originally exiting the fuel cell stack 106 via fuel exhaust conduit 110, the purified recycled fuel exhaust stream exiting the combination carbon dioxide canister trap and water separator device 626 via recycling conduit 634 contains less water and less carbon dioxide overall. The removal of carbon dioxide and water results in the purified recycled fuel exhaust stream in recycling conduit 634 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the combination carbon dioxide canister trap and water separator device 626 via recycling conduit 634 and the purified recycled fuel exhaust stream is provided back to the fuel inlet stream by the recycling conduit 634. The recycling of reduced carbon dioxide fuel exhaust into the fuel inlet increases the performance of the fuel cell stack 106 and the reduction of water increases cell performance.

Figure 7:
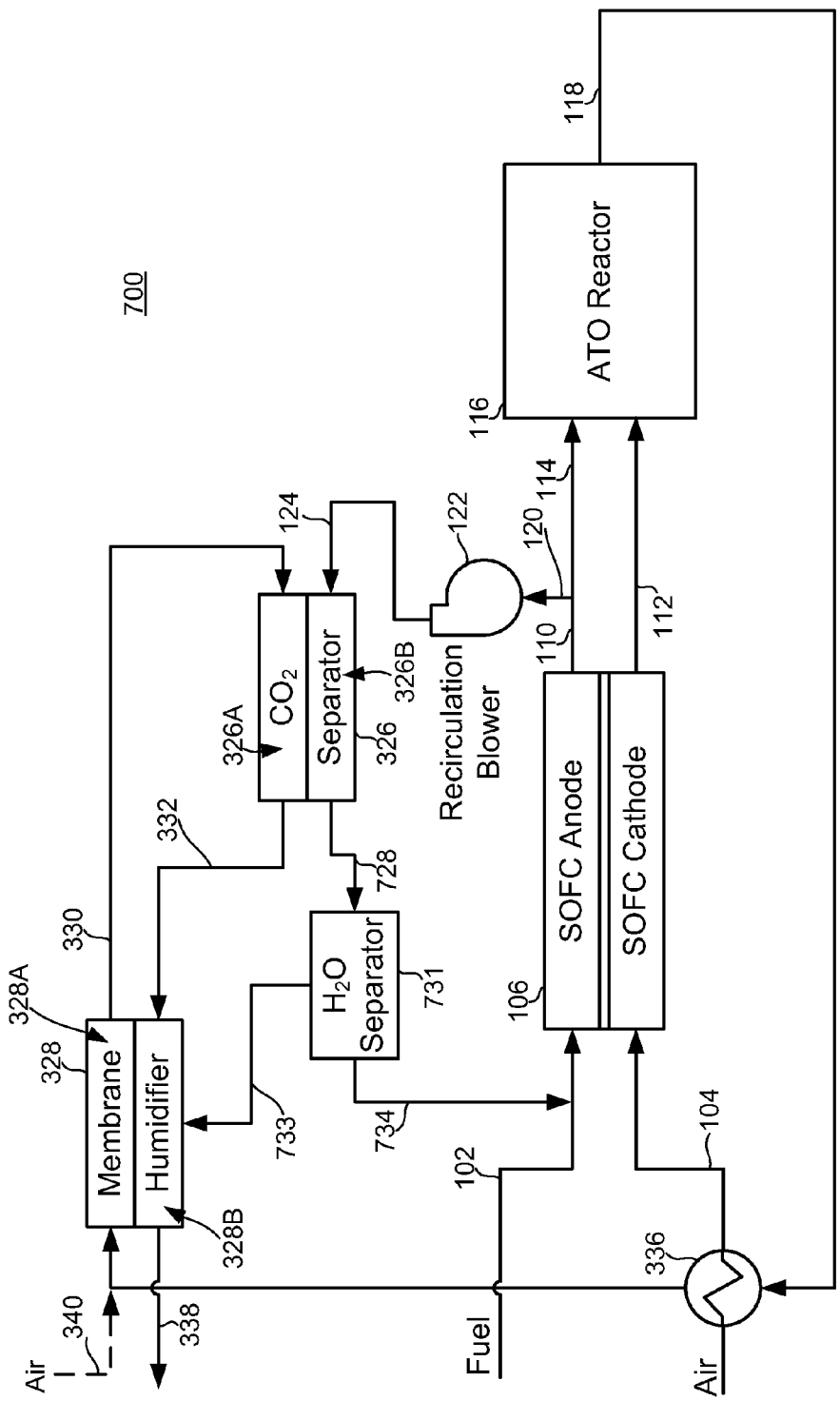

FIG. 7 illustrates a system 700 according to an embodiment of the invention. The system 700 is similar to system 300 illustrated in FIG. 3 and contains a number of components in common. Those components which are common to both systems 300 and 700 are numbered with the same numbers in FIGS. 3 and 7 and will not be described further.

One difference between systems 300 and 700 is that system 700 utilizes a water separator 731 in series with the carbon dioxide separator 326. The utilization of the water separator 731 allows water to be removed from the recycled fuel exhaust stream recycled to the fuel cell stack 106. The removal of water from the recycled fuel exhaust stream increases cell performance.

A purified recycled fuel exhaust stream, containing less carbon dioxide, exits the carbon dioxide separator 326 via recycling conduit 728 and passes to a water separator 730. The water separator 731 may be any type water separator, such as a water condenser separator. The water separator 731 continuously removes water from the purified recycled fuel exhaust stream entering via recycling conduit 728.

A drain on the water separator 731 may provide the collected water to water conduit 733. Water conduit 733 is operatively coupled to the product side 328B of the membrane humidifier 328, and provides water to the membrane humidifier 328. The presence of water received from the water separator 731 via the water conduit 733 may eliminate the need for water conduit 342 present in system 300.

The purified recycled fuel exhaust stream exiting the water separator 731 contains less water than the purified recycled fuel exhaust stream that entered the water separator 731 via recycling conduit 728. Compared to the fuel exhaust stream originally exiting the fuel cell stack 106 via fuel exhaust conduit 110, the purified recycled fuel exhaust stream exiting the water separator 731 via recycling conduit 734 contains less water and less carbon dioxide overall. The removal of carbon dioxide and water results in the purified recycled fuel exhaust stream in recycling conduit 734 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the water separator 731 via recycling conduit 734 and the purified recycled fuel exhaust stream is provided back to the fuel inlet stream by the recycling conduit 734. The recycling of reduced carbon dioxide fuel exhaust into the fuel inlet increases the performance of the fuel cell stack 106 and the reduction of water optimizes the steam to carbon ratio and increases cell performance.

Figure 8:
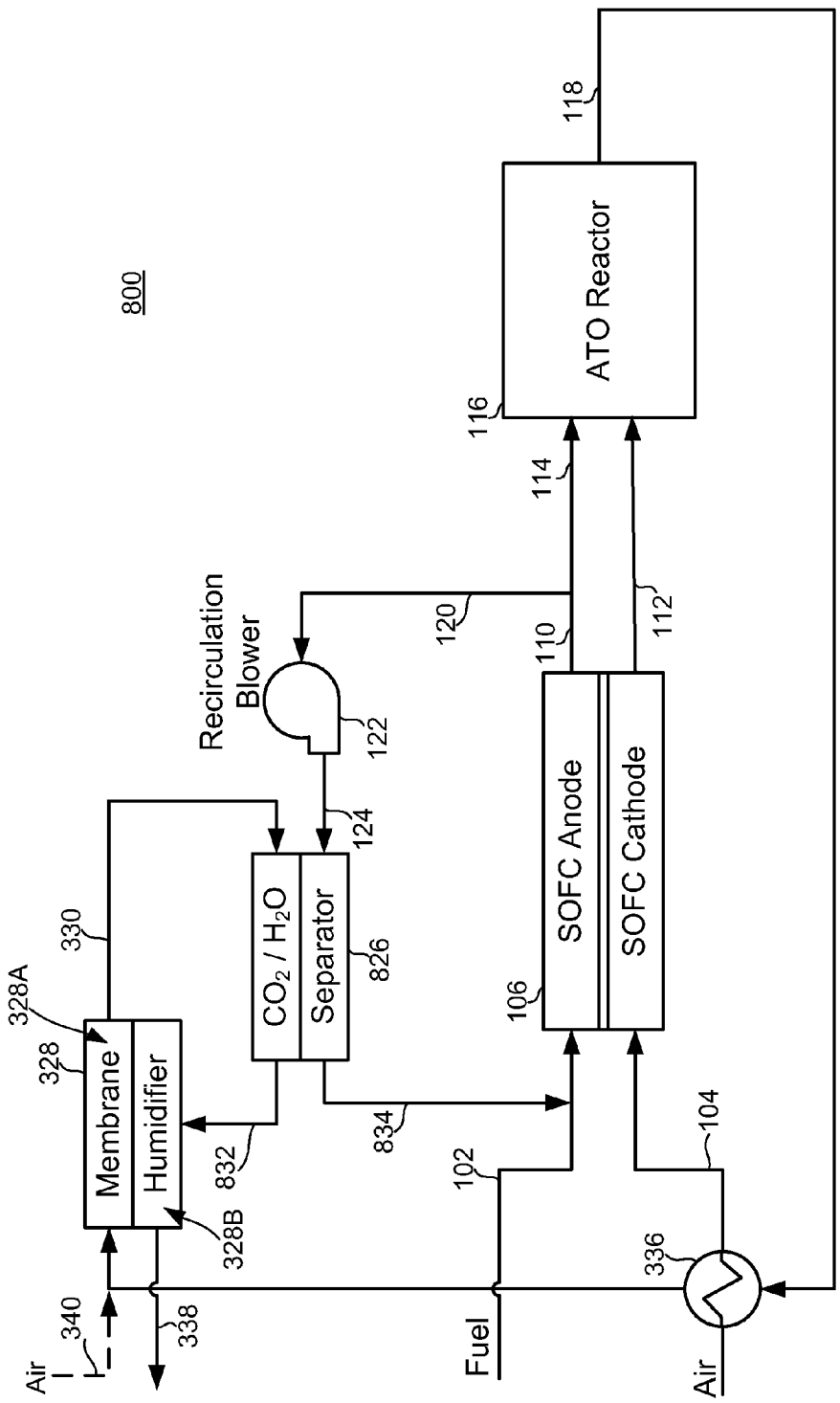

FIG. 8 illustrates a system 800 according to an embodiment of the invention. The system 800 is similar to system 700 illustrated in FIG. 7 and contains a number of components in common. Those components which are common to both systems 700 and 800 are numbered with the same numbers in FIGS. 7 and 8 and will not be described further.

One difference between systems 800 and 700 is that system 800 utilizes a combination carbon dioxide and water separator 826 rather than only a carbon dioxide separator 326 and independent water separator 731. The combination carbon dioxide and water separator 826 functions in a similar manner to produce a purified recycled fuel exhaust stream containing less carbon dioxide and less water to recycle to the fuel cell stack 106, the difference being the carbon dioxide and water are removed at the same time. The combination carbon dioxide and water separator 826 continuously removes carbon dioxide and water from the recycled fuel exhaust stream.

The combination carbon dioxide and water separator 826 receives the recycled fuel exhaust stream via recycling conduit 124. The combination carbon dioxide and water separator 826 removes carbon dioxide and water from the recycled fuel exhaust stream to produce a purified recycled fuel exhaust stream. The purified recycled fuel exhaust stream is passed from combination carbon dioxide and water separator 826 to recycling conduit 834.

The purified recycled fuel exhaust stream exiting the combination carbon dioxide and water separator 826 contains less water than the recycled fuel exhaust stream that entered the combination carbon dioxide and water separator 826 via recycling conduit 124. Compared to the fuel exhaust stream originally exiting the fuel cell stack 106 via fuel exhaust conduit 110, the purified recycled fuel exhaust stream exiting the combination carbon dioxide and water separator 826 via recycling conduit 834 contains less water and less carbon dioxide overall. The removal of carbon dioxide and water results in the purified recycled fuel exhaust stream in recycling conduit 828 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the combination carbon dioxide and water separator 826 via recycling conduit 834 and the purified recycled fuel exhaust stream is provided back to the fuel inlet stream by the recycling conduit 828. The recycling of reduced carbon dioxide fuel exhaust into the fuel inlet increases the performance of the fuel cell stack 106 and the reduction of water optimizes the steam to carbon ratio and increases cell performance.

The water and carbon dioxide removed from the combination carbon dioxide and water separator 826 mixes with purge air received from humid air conduit 330 and exits the combination carbon dioxide and water separator 826 via carbon dioxide conduit 832. The membrane humidifier 328 removes water from the carbon dioxide, water, and air mixture received via carbon dioxide conduit 832. The water removed by the membrane humidifier 328 may be used to humidify the input air to the membrane humidifier 328. In this manner, the need for water conduit 342 present in system 300 may be eliminated.

Figure 9:
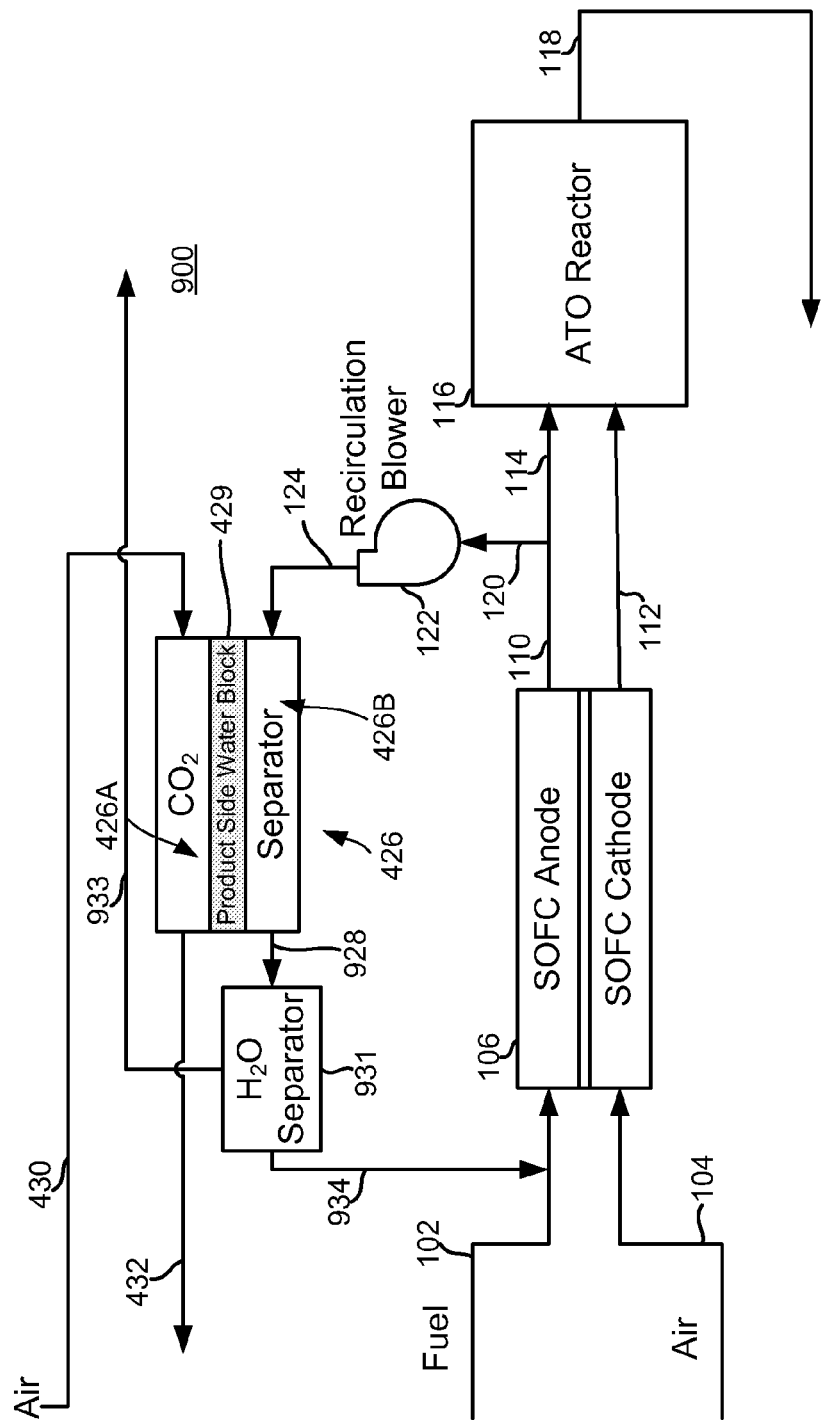

FIG. 9 illustrates a system 900 according to an embodiment of the invention. The system 900 is similar to system 400 illustrated in FIG. 4 and contains a number of components in common. Those components which are common to both systems 400 and 900 are numbered with the same numbers in FIGS. 4 and 9 and will not be described further.

One difference between systems 400 and 900 is that system 900 utilizes a water separator 931 in series with the carbon dioxide membrane separator 426. The utilization of the water separator 931 allows water to be removed from the portion of the recycled fuel exhaust stream recycled to the fuel cell stack 106. The removal of water from the recycled fuel exhaust stream increases cell performance.

A purified (e.g., carbon dioxide depleted) recycled fuel exhaust stream exits the carbon dioxide membrane separator 426 via recycling conduit 928 and passes to the water separator 931. The water separator 931 may be any type water separator, such as a water condenser separator. The water separator 931 continuously removes water from the recycled fuel exhaust stream entering via recycling conduit 928. A drain on the water separator 936 may provide the collected water to water conduit 933.

The purified recycled fuel exhaust stream exiting the water separator 931 contains less water than the purified recycled fuel exhaust stream that entered the water separator 931 via recycling conduit 928. Compared to the fuel exhaust stream originally exiting the fuel cell stack 106 via fuel exhaust conduit 110, the purified recycled fuel exhaust stream exiting the water separator 931 via recycling conduit 934 contains less water and less carbon dioxide overall. The removal of carbon dioxide and water results in the purified recycled fuel exhaust stream in recycling conduit 934 having an increased proportion of both hydrogen and carbon monoxide as a percentage of volume when compared to the fuel exhaust stream originally exiting the fuel cell stack 106 via the fuel exhaust conduit 110.

The purified recycled fuel exhaust stream exits the water separator 931 via recycling conduit 934 and the purified recycled fuel exhaust stream is provided back to the fuel inlet stream by the recycling conduit 934. The recycling of reduced carbon dioxide fuel exhaust into the fuel inlet increases the performance of the fuel cell stack 106 and the reduction of water optimizes the steam to carbon ratio and increases cell performance.

In an alternative embodiment, (not shown), a carbon dioxide membrane separator 926 described in connection with system 900 may be combined with a water separator 936 in the same housing. In this manner the separation of carbon dioxide would occur in the same housing as the separation of water, but the carbon dioxide membrane separator 926 and water separator 936 would remain separate apparatuses.

Figure 10:
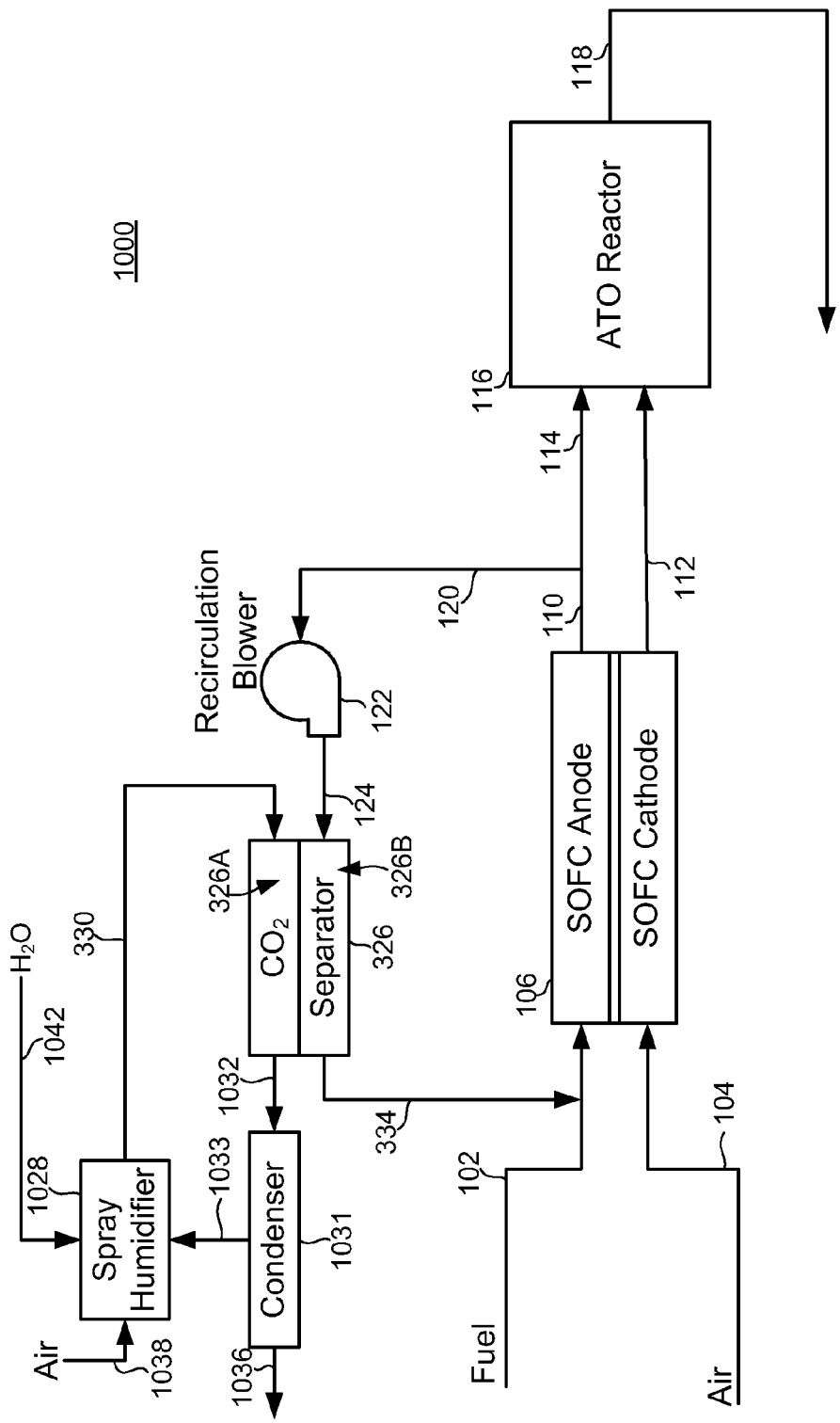

FIG. 10 illustrates a system 1000 according to an embodiment of the invention. The system 1000 is similar to system 300 illustrated in FIG. 3 and contains a number of components in common. Those components which are common to both systems 300 and 1000 are numbered with the same numbers in FIGS. 3 and 10 and will not be described further.

One difference between systems 300 and 1000 is that system 1000 utilizes spray humidifier 1028 to bias carbon dioxide separator 326 by adding water to the collection side 326A of the carbon dioxide separator 326, rather than the membrane humidifier 328 of system 300. Additionally, in system 1000 the air conduit 118 need not be connected to the spray humidifier 1042.

The spray humidifier 1028 is used to add water to the air that will be input to the collection side 326A of the carbon dioxide separator 326.

Air is input to the spray humidifier 1028 via air conduit 1038. Water may be input to the spray humidifier 1028 via a water conduit 1042. Water may also be input to the spray humidifier via water conduit 1033. Water is sprayed into the air input into the spray humidifier 1028 and mixes with the air to produce humid air. The now humid air passes to humid air conduit 330.

Humid air conduit 330 is coupled to the collection side 326A of the carbon dioxide separator 326 and the humid air is used to bias the separation of carbon dioxide by the carbon dioxide separator 326. Where a traditional carbon dioxide separator naturally selects for water in a reaction, the presence of water on the collection side of the carbon separator reduces the selection of water and increases the efficiency of the carbon dioxide separator to select for carbon dioxide. In this manner the increase amount of water in the air entering the carbon dioxide separator 326 biases the collection side 326A of the carbon dioxide separator 326 to select for carbon dioxide from the recycled fuel exhaust stream.

The humid air and carbon dioxide mixture travels from the carbon dioxide separator via carbon dioxide conduit 1032 to a condenser 1031. The condenser 1031 removes a portion of the water from the humid air and carbon dioxide mixture, and outputs carbon dioxide and air via output conduit 1036. The water collected in the condenser 1031 may be provided to water conduit 1033 and input to the spray humidifier 1028.

Figure 11:
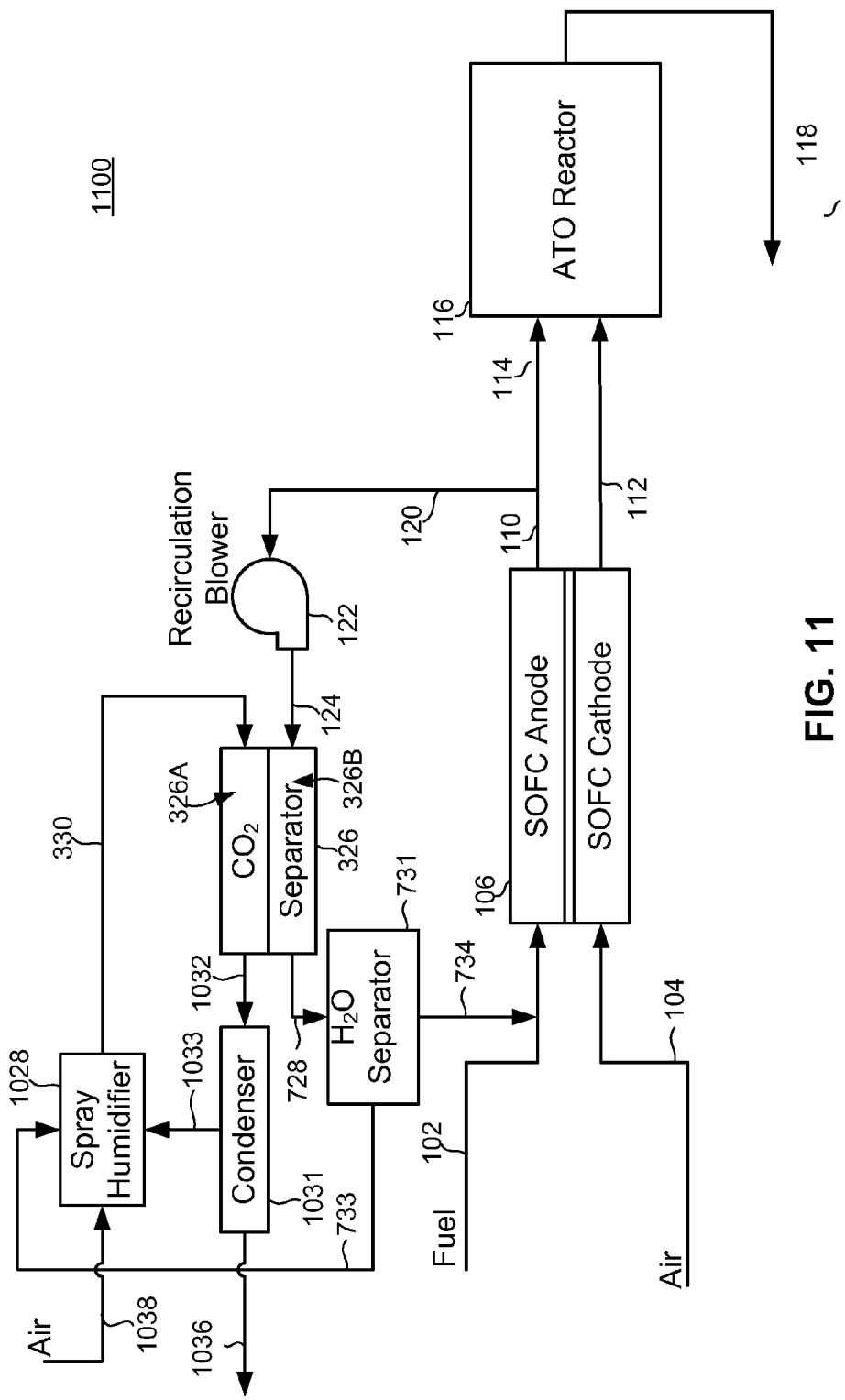

FIG. 11 illustrates a system 1100 according to an embodiment of the invention. The system 1100 is similar to system 700 illustrated in FIG. 7 and contains a number of components in common. Those components which are common to both systems 700 and 1100 are numbered with the same numbers in FIGS. 7 and 11 and will not be described further.

One difference between systems 700 and 1100 is that system 1100 utilizes spray humidifier 1028 to bias carbon dioxide separator 326 by adding water to the collection side of the carbon dioxide separator 326, rather than the membrane humidifier 328 of system 700. Additionally, in system 1100 the air conduit 118 need not be connected to the spray humidifier 1042 and contains two water separators 731 and 1031. Water separator 731 is located at the output of the product side 326B of the carbon dioxide separator 326 and water separator 1031 is located at the output of the collection side 326A of the carbon dioxide separator 326. Thus, system 1100 is a combination of systems 700 and 1000.

A drain on the water separator 730 may provide the collected water to water conduit 733. Water conduit 733 is operatively coupled to the spray humidifier 1028, and provides water to the spray humidifier 1028.

The spray humidifier 1028 is used to add water to the air that will be input to the collection side of the carbon dioxide separator 326.

Air is input to the spray humidifier 1028 via air conduit 1038. Water may be input to the spray humidifier 1028 from the water separator 731 via water conduit 733. Water may also be input to the spray humidifier from condenser 1031 via water conduit 1033. Water is sprayed into the air input into the spray humidifier 1028 and mixes with the air to produce humid air. The now humid air passes to humid air conduit 330.

Humid air conduit 330 is coupled to the collection side 326A of the carbon dioxide separator 326 and the humid air is used to bias the separation of carbon dioxide by the carbon dioxide separator 326. Where a traditional carbon dioxide separator naturally selects for water in a reaction, the presence of water on the collection side of the carbon separator reduces the selection of water and increases the efficiency of the carbon dioxide separator to select for carbon dioxide. In this manner the increase amount of water in the air entering the collection side 326A of the carbon dioxide separator 326 biases the carbon dioxide separator 326 to select for carbon dioxide from the recycled fuel exhaust stream.

The humid air and carbon dioxide mixture travels from the carbon dioxide separator via carbon dioxide conduit 1032 to a water separator, such as a condenser 1031. The condenser 1031 removes a portion of the water from the humid air and carbon dioxide mixture, and outputs carbon dioxide and air via output conduit 1036. The water collected in the condenser 1031 may be provided to water conduit 1033 and input to the spray humidifier 1028.

Figure 12:
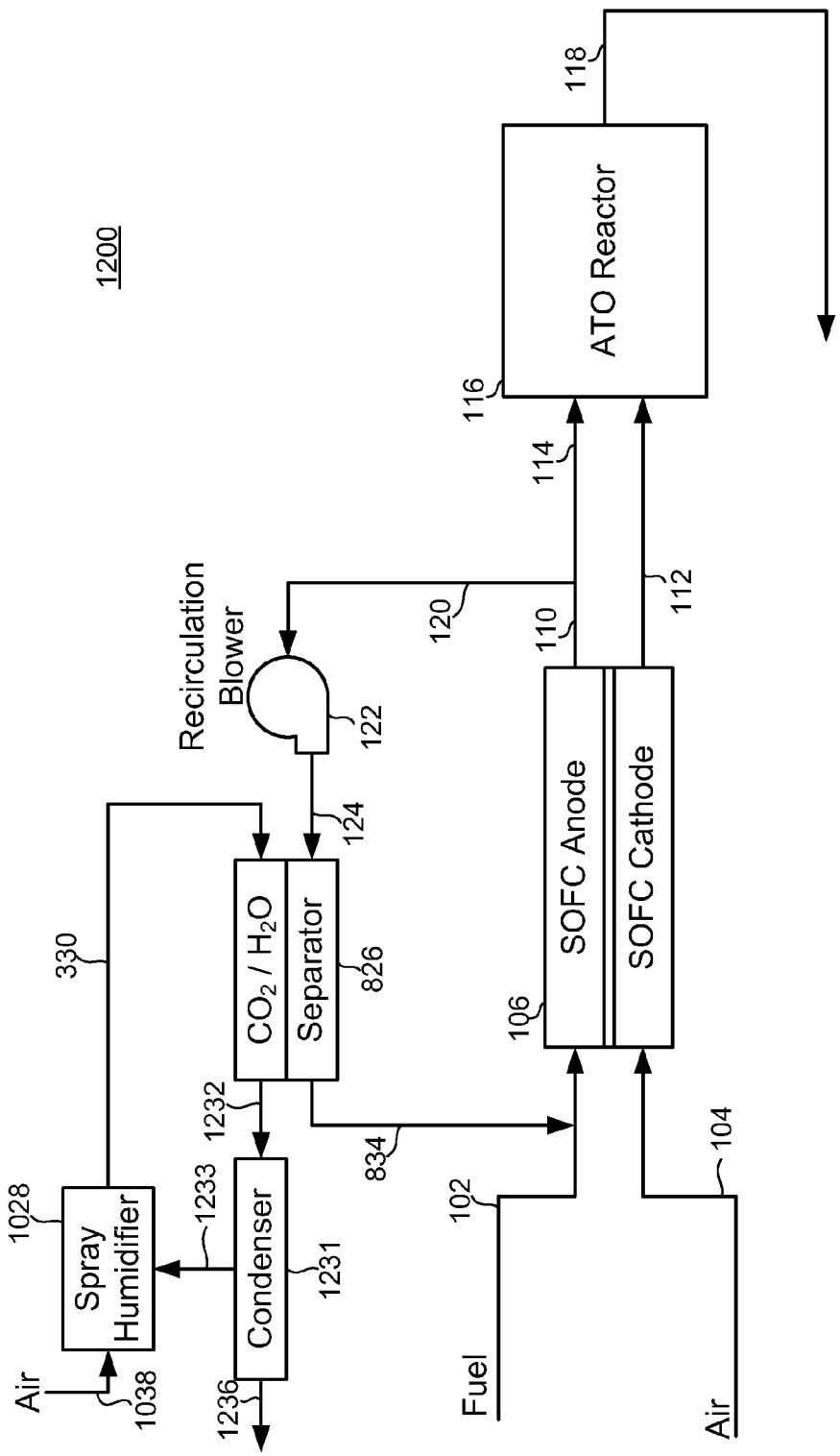

FIG. 12 illustrates a system 1200 according to an embodiment of the invention. The system 1200 is similar to system 800 illustrated in FIG. 8 and contains a number of components in common. Those components which are common to both systems 800 and 1200 are numbered with the same numbers in FIGS. 8 and 12 and will not be described further.

One difference between systems 800 and 1200 is that system 1200 utilizes spray humidifier 1028 to bias the combination carbon dioxide and water separator 826 by adding water to the collection side of the combination carbon dioxide and water separator 826, rather than utilizing the membrane humidifier 328 of system 800. Additionally, in system 1200 the air conduit 118 need not be connected to the spray humidifier 1028. System 1200 is a combination of systems 800 and 1000 in that it contains the combination carbon dioxide and water separator 826 and the spray humidifier 1028.

The spray humidifier 1028 is used to add water to the air that will be input to the collection side of the carbon dioxide separator 826.

The water and carbon dioxide removed from the combination carbon dioxide and water separator 826 mixes with purge air received from humid air conduit 330 and exits the combination carbon dioxide and water separator 826 via carbon dioxide conduit 1232.

Air is input to the spray humidifier 1028 via air conduit 1038. Water may be input to the spray humidifier 1028 via a water conduit 1233. Water is sprayed into the air input into the spray humidifier 1028 and mixes with the air to produce humid air. The now humid air passes to humid air conduit 330 to be provided to the collection side of the carbon dioxide and water separator 826.

The humid air and carbon dioxide mixture travels from the combination carbon dioxide and water separator 826 via carbon dioxide conduit 1232 to a water separator, such as the condenser 1231. The condenser 1231 removes a portion of the water from the humid air and carbon dioxide mixture, and outputs carbon dioxide and air via output conduit 1236. The water collected in the condenser 1231 may be provided to water conduit 1233 and input to the spray humidifier 1028.

Figure 13:
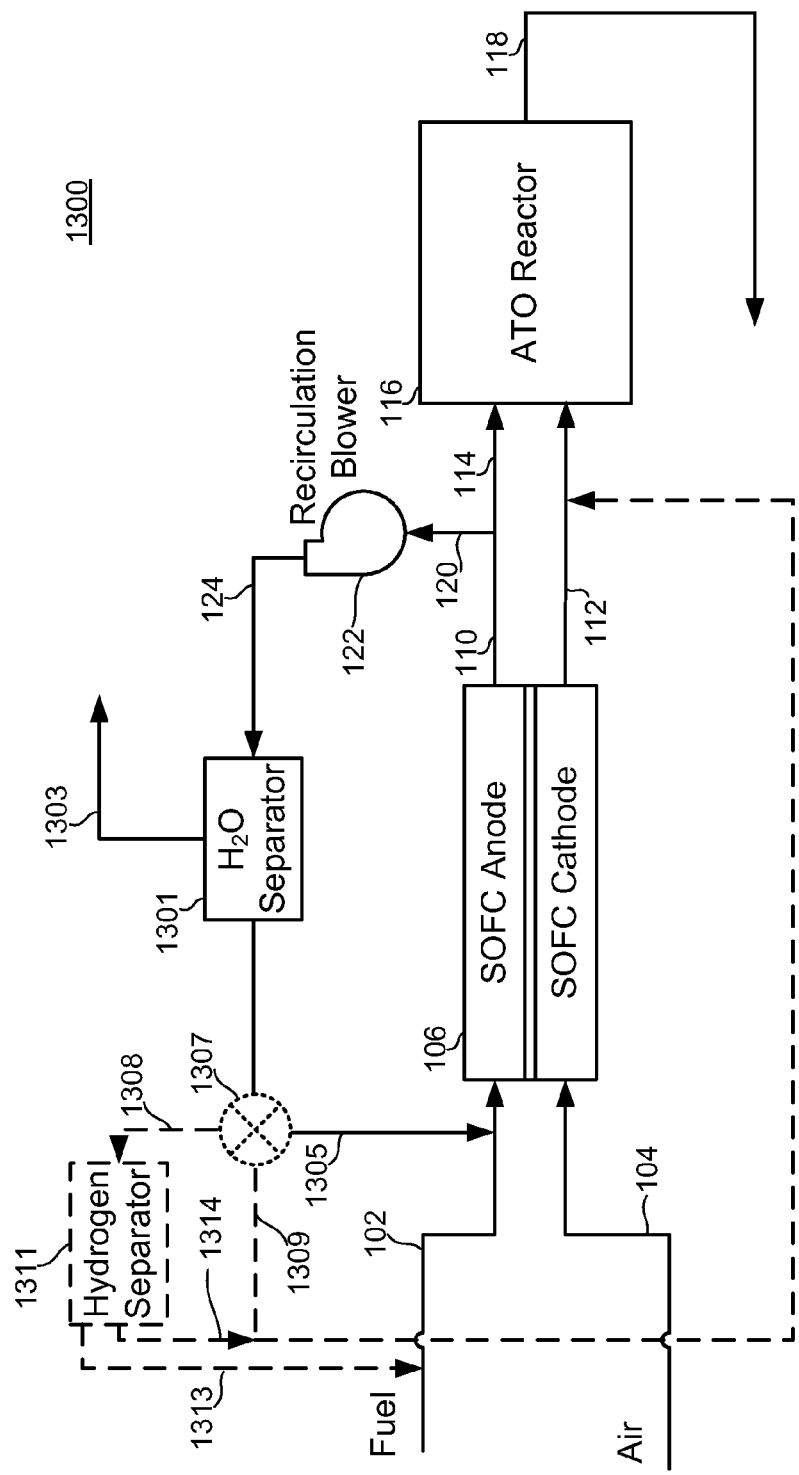

FIG. 13 illustrates a system 1300 according to an embodiment of the invention. The system 1300 is similar to system 100 illustrated in FIG. 1 and contains a number of components in common. Those components which are common to both systems 100 and 1300 are numbered with the same numbers in FIGS. 1 and 13 and will not be described further.

One difference between systems 100 and 1300 is that system 1300 may utilize a water separator 1301 as opposed to a carbon dioxide canister trap 126 or another carbon dioxide separator. The utilization of the water separator 1301 allows water to be removed from the portion of the recycled fuel exhaust stream recycled to the fuel cell stack 106. In system 1300, the recirculation blower 122 is coupled to recycling conduit 120 to provide the recycled fuel exhaust stream from recycling conduit 120 to a water separator 1301 via recycling conduit 124. Thus, in this embodiment, water rather than carbon dioxide is removed from the fuel exhaust stream.

The water separator 1301 may be any type water separator, such as an air cooled water condenser separator where steam is cooled to liquid water, which settles to the bottom of the separator by gravity, while remaining gases (e.g., carbon monoxide, carbon dioxide, hydrogen, etc) exit via recycling conduit 1305. The water separator 1301 continuously removes water from the recycled fuel exhaust stream entering via recycling conduit 124. A drain in the water separator 1301 may provide the collected water to water conduit 1303. Water conduit 1303 may discharge the collected water away from the fuel inlet stream or additionally out of the system 1300. Preferably the water separator 1301 removes up to 65% of the water from the recycled fuel exhaust stream. The water separator 1301 may remove less than 65%, such as about 1-50%, 50%-40%, including 40%-30%, 30%-20%, 20%-10%, or 10%-1% of the water from the recycled fuel exhaust stream.

The recycled fuel exhaust stream exiting the water separator 1301 contains less water than the recycled fuel exhaust stream that entered the water separator 1301 via recycling conduit 124. Compared to the fuel exhaust stream originally exiting the fuel cell stack 106 via fuel exhaust conduit 110, the recycled fuel exhaust stream exiting the water separator 1301 via recycling conduit 1305 contains less water overall (i.e., is a drier recycled fuel exhaust stream). The removal of water results in the drier recycled fuel exhaust stream in recycling conduit 1305 having an increased proportion of hydrogen, carbon monoxide, and carbon dioxide as a percentage of volume when compared to the fuel exhaust stream originally exiting the fuel cell stack 106 via the fuel exhaust conduit 110.

The drier recycled fuel exhaust stream exits the water separator 1301 via recycling conduit 1305 and the drier recycled fuel exhaust stream is provided back to the fuel inlet stream by the recycling conduit 1305. The removal of water from the recycled fuel exhaust stream optimizes the steam to carbon ratio and increases cell performance, and the recycling of fuel exhaust containing less water into the fuel inlet increases the performance of the fuel cell stack 106. SOFC fuel cells using natural gas fuel produce chemical byproducts of two thirds water and one third carbon dioxide. These byproducts dilute the fuel to the point that it is not practical to function with a fuel utilization of greater than approximately 88% including partial recirculation of the anode exhaust. Separation and removal of a portion of the water in the recirculated anode exhaust allows an increase in fuel utilization to over 89%, such as 90-95%, such as about 95% and a resultant 3 to 4 efficiency points increase. Fuel cells generally degrade in performance over time and produce more waste heat in the process. This results in the need to combust less or no fuel for balancing the heat loss and removal of water and/or carbon dioxide allows a higher fuel utilization within the active fuel cells. Since both the product water and the product carbon dioxide cause the same negative Nernst voltage effect, the inventors realized that water, being twice the volume of carbon dioxide, would have a bigger impact in its removal than removing carbon dioxide. Water separated from the fuel (anode) recirculation loop can allow fuel utilization to be increased into the mid 90's percentile, e.g., such as 90-95%, and efficiency gains up to about 4 points, but not exceeding about 64% based on the fuel LHV. Therefore, the water separator in the anode recycle loop achieves up to about 95% fuel utilization by increasing the recycle rate from 58% up to about 85% while removing up to about 65% of the product water when the SOFC system requires less fuel combustion for heat balance. This is accomplished while maintaining the single pass fuel utilization at about 75% and the fuel inlet oxygen to carbon ratio at 2.0.

In an alternative embodiment, all or a portion of the drier recycled fuel exhaust stream may be passed to a hydrogen separator 1311. The hydrogen separator 1311 is optional and is preferably omitted. A valve 1307 may direct all or a portion of the drier recycled fuel exhaust stream from recycling conduit 1305 into conduit 1309 and valve 1307 may direct all or a portion of the drier recycled fuel exhaust stream from recycling conduit 1305 to conduit 1308. Conduit 1309 may be coupled to air exhaust conduit 112 and may provide the drier recycled fuel exhaust stream to air exhaust conduit 112 via which the drier recycled fuel exhaust stream may be provided to the ATO reactor 116.

Conduit 1308 may be coupled to a hydrogen separator 1311. Hydrogen separator 1311 may be any type hydrogen separator, such as a cascaded electrochemical hydrogen pump separation unit which electrochemically separates hydrogen from the drier recycled fuel exhaust stream. The hydrogen separator 1311 may separate about 95%, such as 95% to about 100% of the hydrogen contained in the drier recycled fuel exhaust stream entering via conduit 1308. The separated hydrogen may be provided to the fuel inlet stream by hydrogen conduit 1313. The remaining gases in the drier recycled fuel exhaust stream may exit the hydrogen separator 1311 via conduit 1314 which may be coupled to conduit 1309. In this manner the remaining gases in the drier recycled fuel exhaust stream may be provided to the ATO reactor 116.

Figure 14:
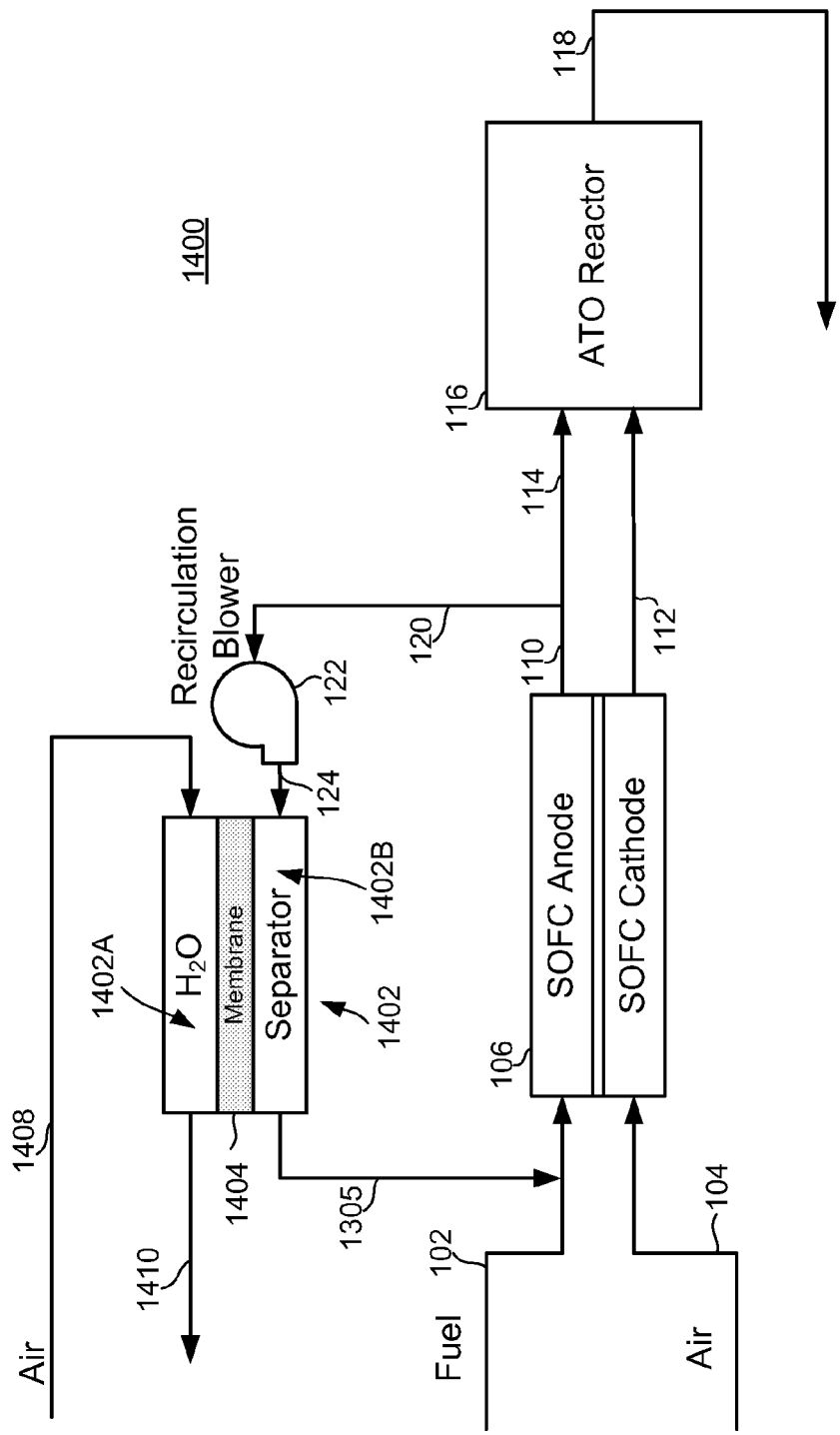

FIG. 14 illustrates a system 1400 according to an embodiment of the invention. The system 1400 is a specific embodiment of system 1300 illustrated in FIG. 13 and contains a number of components in common. Those components which are common to both systems 1300 and 1400 are numbered with the same numbers in FIGS. 13 and 14 and will not be described further.

System 1400 is a specific embodiment of system 1300 in which a water membrane separator 1402 biased by air is used. The air flow controlled selective water vapor membrane separator 1402 preferably removes excess water to maintain the fuel inlet oxygen to carbon ration at 2.0 and may discharge the water vapor into the atmosphere. The utilization of the water membrane separator 1402 biased by air allows water to be removed from the portion of the recycled fuel exhaust stream recycled to the fuel cell stack 106. The water membrane separator 1402 continuously removes water from the recycled fuel exhaust stream entering via recycling conduit 124.

Water membrane separator 1402 may comprise a polymeric membrane separator. The membrane 1404 of water membrane separator 1402 may be a Nafion® membrane. For example, one separator made by Perma Pure, LLC is based on Nafion® membrane tubes within a 316 stainless steel housing. The Nafion® is specified by its manufacturer DuPont to operate up to 190 C. When used with gasses as a dryer, it is specified by Perma Pure to operate at temperatures up to 150 C. A pair of one foot long drying units at about 2.5 inches in diameter operating in a vertical parallel arrangement has acceptable pressure drop and drying capability. The water membrane separator 1402 may be oriented in any direction. In a preferred embodiment the water membrane separator 1402 may be a vertically positioned tubular membrane separator (i.e., positioned such that the central axis of the membrane tube is vertical in relation to the ground). The selective water vapor membrane separator embodiment has the advantages of being low cost, low parasitic power, easy to integrate, compatible with carbon dioxide sequestration, and discharges the water vapor into the atmosphere. Water may be collected by the water membrane separator 1402 from recycling conduit 124 on the product side 1402B of the water membrane separator 1402. Water permeates across the membrane 1404 from the product side 1402B to collection side 1402A of water membrane separator 1402. The partial pressure of the water in the product side 1402B of the water membrane separator 1402 drives diffusion of the water across the membrane 1404 to the collection side 1402A of the water membrane separator 1402. Preferably the water membrane separator 1402 removes substantially 50% of the water from the recycled fuel exhaust stream. The water membrane separator 1402 may remove up to 65%, such as about 1-50%, 50%-40%, 40%-30%, 30%-20%, 20%-10%, or 10%-1% of the water from the recycled fuel exhaust stream.

The drier recycled fuel exhaust stream exiting the water membrane separator 1402 contains less water than the recycled fuel exhaust stream that entered the water membrane separator 1402 via recycling conduit 124. Compared to the fuel exhaust stream originally exiting the fuel cell stack 106 via fuel exhaust conduit 110, the drier recycled fuel exhaust stream exiting the water membrane separator 1402 via recycling conduit 1305 contains less water overall. The removal of water results in the drier recycled fuel exhaust stream in recycling conduit 1305 having an increased proportion of hydrogen, carbon monoxide, and carbon dioxide as a percentage of volume when compared to the fuel exhaust stream originally exiting the fuel cell stack 106 via the fuel exhaust conduit 110.

The drier recycled fuel exhaust stream exits the water membrane separator 1402 from the product side 1402B via recycling conduit 1305 and the drier recycled fuel exhaust stream is provided back to the fuel inlet stream by the recycling conduit 1305.

Air may be provided to the collection side 1402A of the water membrane separator 1402 via air conduit 1408 which is operatively coupled to the collection side 1402A of the water membrane separator 1402. An air blower (not shown) may be used to blow air into conduit 1408. The air removes water from the collection side 1402A of the water membrane separator 1402. The water membrane separator 1402 is operatively coupled to discharge conduit 1410 and the air and water mixture flows from the collection side 1402A of the water membrane separator 1402 to the discharge conduit 1410. Discharge conduit 1410 may discharge the air and evaporated water mixture away from the fuel inlet stream or additionally out of the system 1400, for example into the atmosphere as humid air or water vapor and air. The addition of air to the collection side 1402A of the water membrane separator 1402 biases the water membrane separator 1402 such that the partial pressure of water on the collection side 1402A is less than the partial pressure of water on the product side 1402B. The difference in partial pressure drives the diffusion of water across the membrane 1404 of the water membrane separator 1402.

FIGS. 13 and 14 illustrate embodiments of fuel cell systems in which all the fuel exhaust is recycled into a water separator before any fuel exhaust is provided into the fuel inlet stream. The overall advantages of the embodiments of FIGS. 13 and 14 are to increase the overall average efficiency of the SOFC system by up to 4 percentage points and extending the SOFC system lifetime at any specific voltage level. Both embodiments have the advantage of being able to use commercially available components to fashion the system. The specific advantages of each embodiment are: the water condenser separator 1302 embodiment of FIG. 13 has the advantages of being low cost, low parasitic power, easy to integrate, and compatible with carbon dioxide sequestration; and the selective water vapor membrane separator 1402 embodiment of FIG. 14 has the advantages of being low cost, low parasitic power, easy to integrate, compatible with carbon dioxide sequestration, and discharges the water vapor into the atmosphere.

Figure 15:
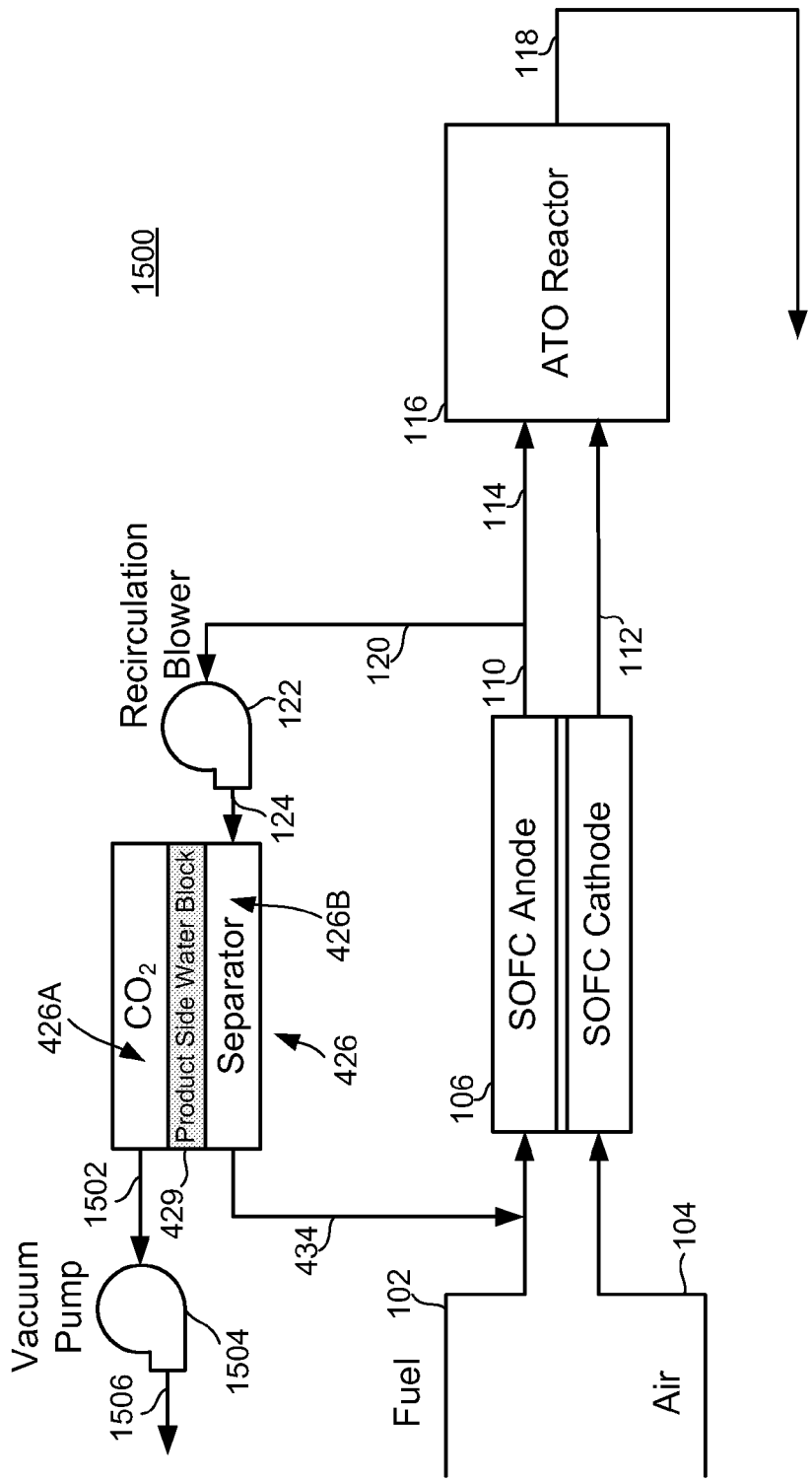

FIG. 15 illustrates a system 1500 according to an embodiment of the invention. The system 1500 is similar to system 400 illustrated in FIG. 4 and contains a number of components in common. Those components which are common to both systems 400 and 1500 are numbered with the same numbers in FIGS. 4 and 15 and will not be described further.

One difference between systems 400 and 1500 is that system 1500 utilizes a vacuum pump 1504 to remove separated carbon dioxide from the collection side 426A of the carbon dioxide membrane separator 426 rather than purge air. The utilization of a vacuum pump 1504 may be more effective than purge air, and the parasitic power draw of the vacuum pump 1504 may not be so large as to overcome the benefit of using the vacuum pump 1504. An output conduit 1502 may be operatively connected to the collection side 426A of the carbon dioxide membrane separator 426. The output conduit 1502 may be operatively connected to the vacuum pump 1504. An output conduit 1506 may be coupled to the vacuum pump 1504. In operation, the vacuum pump 1504 may pull carbon dioxide from the collection side 426A of the carbon dioxide membrane separator 426 via output conduit 1502.

In an alternative embodiment (not shown) nitrogen rather than air may be used as the purge gas for carbon dioxide separators. In another alternative embodiment (not shown) the membrane of a carbon dioxide separator may include amine.

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A method of operating a fuel cell system, comprising:
providing a fuel inlet stream to a fuel inlet of a fuel cell stack;
operating the fuel cell stack using the fuel inlet stream to generate a fuel exhaust stream that is output from the fuel cell stack;
dividing the fuel exhaust stream into a first portion and a second portion;
providing the first portion of the fuel exhaust stream to a carbon dioxide separation device, to separate at least a portion of the carbon dioxide from the first portion of the fuel exhaust stream and thereby generate a purified fuel exhaust stream;
providing the second portion of the fuel exhaust stream to the carbon dioxide separation device to sweep carbon dioxide from a collection side of the carbon dioxide separation device; and
recycling the purified fuel exhaust stream to the fuel inlet.

2. The method of claim 1, further comprising:
mixing air into the second portion of the fuel exhaust stream; and
providing the mixed air and second portion of the fuel exhaust stream to the collection side of the carbon dioxide separation device.

3. The method of claim 1, further comprising:
using a membrane humidifier to humidify the second portion of the fuel exhaust stream; and
providing the humidified second portion of the fuel exhaust stream to the collection side of the carbon dioxide separation device.

4. The method of claim 1, further comprising:
removing water from the purified recycled fuel exhaust stream using a water separator;
providing the water to a membrane humidifier;
providing the water from using the membrane humidifier to humidify the second portion of the fuel exhaust stream; and
providing the humidified second portion of the fuel exhaust stream to the collection side of the carbon dioxide separation device.

5. The method of claim 1, wherein the carbon dioxide separation device is a combination carbon dioxide and water separation device, the method further comprising:
removing water from the first portion of the fuel exhaust stream using the carbon dioxide separation device,
providing the water to a membrane humidifier;
using the membrane humidifier to humidify the second portion of the fuel exhaust stream; and
providing the humidified second portion of the fuel exhaust stream to the collection side of the carbon dioxide separation device.

6. The method of claim 1, wherein the first portion of the fuel exhaust stream is provided to a product side of the carbon dioxide separation device, the purified fuel exhaust stream is collected on the product side of the carbon dioxide separation device, the carbon dioxide diffuses through a separator from the product to the collection side of the carbon dioxide separation device, and the fuel cell stack is a solid oxide fuel cell (SOFC) stack, the method further comprising:

oxidizing a SOFC fuel exhaust stream using a SOFC air exhaust stream prior to providing the second portion of the fuel exhaust stream to the carbon dioxide separation device.

7. A method of operating a fuel cell system, comprising:
providing a fuel inlet stream to a fuel inlet of a fuel cell stack;
operating the fuel cell stack using the fuel inlet stream, to generate a fuel exhaust stream that is output from the fuel cell stack;
dividing the fuel exhaust stream into a first portion and a second portion;
providing the first portion of the fuel exhaust stream to a molten carbonate fuel cell operating in electrolysis mode, which operates as a carbon dioxide separator to separate carbon dioxide from the first portion of the fuel exhaust stream and form a purified fuel exhaust stream;
recycling the purified fuel exhaust stream to the fuel inlet;
removing water from the purified recycled fuel exhaust stream using a water separator;
providing the water to a membrane humidifier;
using the membrane humidifier to humidify the second portion of the fuel exhaust stream; and
providing the humidified second portion of the fuel exhaust stream to a collection side of the carbon dioxide separator.

8. The method of claim 7, wherein the providing of the second portion of the fuel exhaust stream to the carbon dioxide separation device further comprises oxidizing the second portion of the fuel exhaust stream in an anode tail gas oxidizer reactor, and providing the oxidized second portion of the fuel exhaust stream to the carbon dioxide separation device.

9. The method of claim 1, wherein the providing of the second portion of the fuel exhaust stream to the carbon dioxide separation device further comprises oxidizing the second portion of the fuel exhaust stream in an anode tail gas oxidizer reactor, and providing the oxidized second portion of the fuel exhaust stream to the carbon dioxide separation device.

* * * * *